US008335724B2

(12) United States Patent
Sipes et al.

(10) Patent No.: US 8,335,724 B2
(45) Date of Patent: Dec. 18, 2012

(54) CUSTOMIZED VIRTUAL CATALOG

(75) Inventors: David D. Sipes, Foster City, CA (US); Gerald McLaughlin, Makati (PH)

(73) Assignee: Branders.com, Inc., Mountain View, CA (US)

( * ) Notice: Subject to any disclaimer, the term of this patent is extended or adjusted under 35 U.S.C. 154(b) by 305 days.

(21) Appl. No.: 12/191,235

(22) Filed: Aug. 13, 2008

(65) Prior Publication Data
US 2010/0042484 A1    Feb. 18, 2010

(51) Int. Cl.
G06Q 30/00    (2012.01)
(52) U.S. Cl. .................. 705/26.1; 705/26.5; 705/26.61; 705/26.62; 705/26.63; 705/27.1; 705/27.2
(58) Field of Classification Search .............. 705/24–26, 705/26.1, 26.5, 26.61, 26.62, 26.63, 26.64, 705/27.1, 27.2
See application file for complete search history.

(56) References Cited

U.S. PATENT DOCUMENTS

| | | | |
|---|---|---|---|
| 5,970,471 A * | 10/1999 | Hill | 705/26.8 |
| 7,050,654 B2 * | 5/2006 | Lunetta et al. | 382/284 |
| 7,191,145 B1 * | 3/2007 | Lunetta et al. | 705/26.5 |
| 7,216,092 B1 | 5/2007 | Weber et al. | |
| 2001/0031102 A1 * | 10/2001 | Lunetta et al. | 382/284 |
| 2003/0028451 A1 * | 2/2003 | Ananian | 705/27 |
| 2003/0158796 A1 * | 8/2003 | Balent | 705/28 |
| 2005/0177453 A1 | 8/2005 | Anton et al. | |
| 2005/0259883 A1 * | 11/2005 | Lunetta et al. | 382/248 |
| 2006/0031392 A1 * | 2/2006 | Lunetta et al. | 709/217 |
| 2008/0082415 A1 | 4/2008 | Shastry | |
| 2008/0162305 A1 | 7/2008 | Rousso et al. | |

OTHER PUBLICATIONS

"International Application Serial No. PCT/US2009/046746, Search Report and Written Opinion mailed Apr. 12, 2010", 9 pgs.
"International Application Serial No. PCT/US2009/046746, International Preliminary Report on Patentability mailed May 7, 2011", 7 pgs.

* cited by examiner

*Primary Examiner* — Ig T An
(74) *Attorney, Agent, or Firm* — Schwegman Lundberg Woessner P.A.

(57) ABSTRACT

Various embodiments include an apparatus comprising a server operable to generate a customized virtual catalog including a plurality of composite images, wherein at least one of the plurality of composite images includes an image of a promotional product decorated using a decorative image associated with a client requesting access to the customized virtual catalog.

34 Claims, 10 Drawing Sheets

CUSTOMIZED VIRTUAL CATALOG

BACKGROUND

The sale of promotional products, also called advertising specialties, has traditionally been practiced as a broker-customer relationship where a commissioned broker presents, in-person, various product lines and decoration choices to a customer. For example, a customer may call a broker in regards to promoting their company at a client appreciation golf tournament. The broker presents the customer with various products, i.e., hats, shirts, mugs, etc., which can be decorated using selected decorative technologies, i.e., embroidery, silk-screening, etc. For example, the customer may select a green polo shirt with the intention that it be decorated with company logo, graphic, name, or other text or symbol using, for example, black embroidery above the shirt pocket. The broker then facilitates the coordination among the customer, product vendor, and decorators to supply the requested customized product in the time required by the customer.

Due to the large number of product manufacturers and decorators, the broker usually carries a selected product line from various manufacturers, and utilizes a selected group of decorators to apply the necessary decoration to the product. The customer, therefore, is presented a limited group of products and limited options for decorating the products. Moreover, when choosing the product, the customer generally is looking at catalog images or samples that are blank—that is, that are undecorated, or that are decorated with some design intended to be representative of a "typical" decorated product. In these instances, the customer is left to imagine the appearance of the decorated product, or must imagine their particular decorative logo used to decorate the product, until after placing an order and waiting to see a produced and decorated product. Thus, typically, the customer usually does not see the final product until it arrives. Furthermore, until the product arrives, the customer must depend upon the broker to ensure the order is delivered on time and appears as was anticipated.

BRIEF DESCRIPTION OF THE DRAWINGS

The embodiments of the present inventive subject matter are illustrated by way of example and not limitation in the figures of the accompanying drawings, in which like references indicate similar elements and in which.

DETAILED DESCRIPTION

Figure 1A:
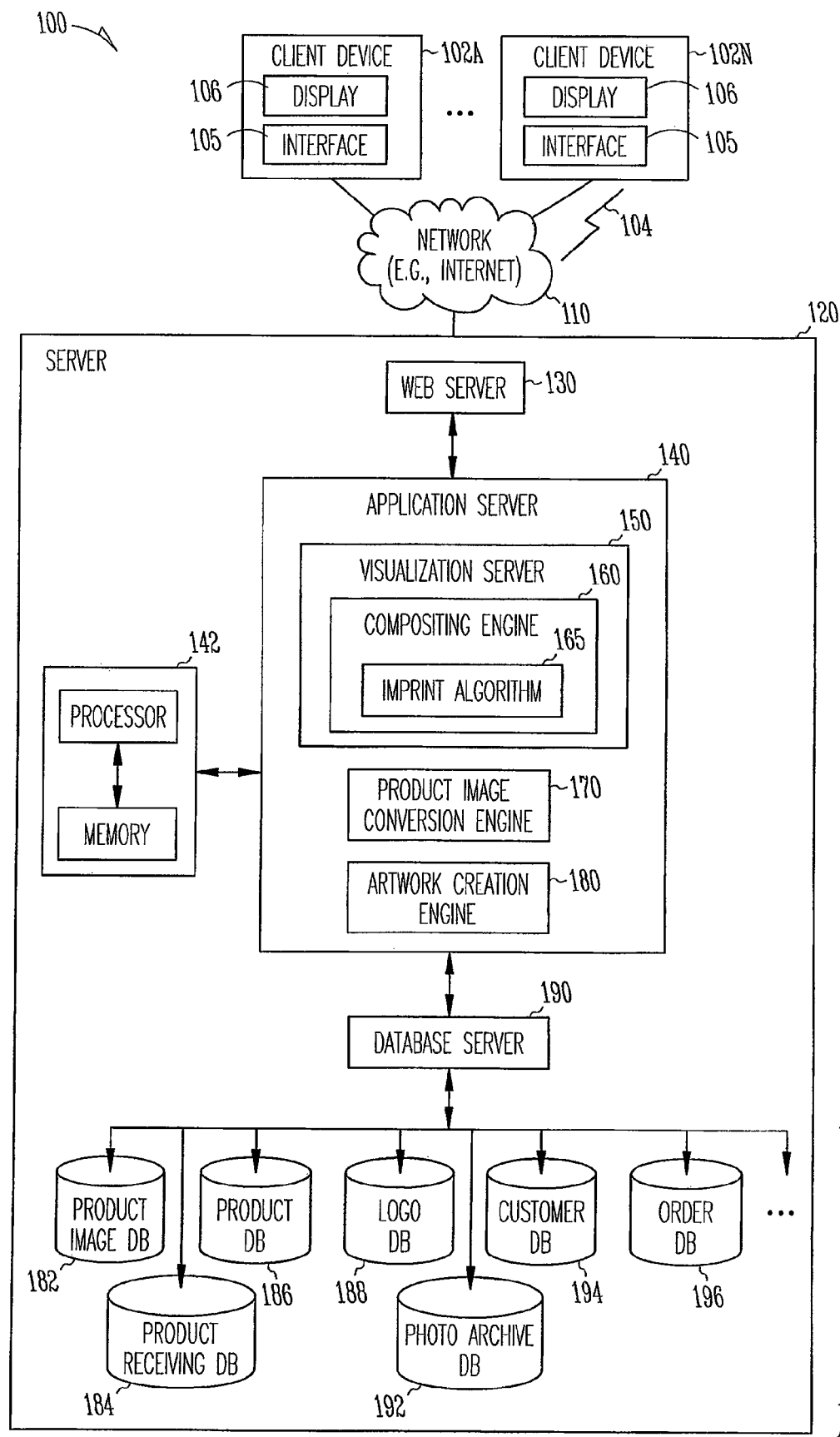
FIG. 1A is a diagram of a system according to various embodiments.

Although the present inventive subject matter is described below by way of various embodiments that include specific structures and methods, embodiments that include alternative structures and methods can be employed without departing from the principles of the inventive subject matter described herein.

In general, embodiments described below feature composite image generation, including in various embodiments a network-based application that provides access to a customized virtual catalog. In various embodiments, the customized virtual catalog provided as, for example but not limited to, one or more web pages. In various embodiments, the web pages include a plurality images of promotional products, wherein one or more of the images of the promotional products are displayed to a given user accessing the customized virtual catalog having a decorative image associated with the given user placed onto the one or more images of the promotional products. In various embodiments, each of the plurality of images of promotional products displayed when a given user accesses the customized virtual catalog is displayed as having at least one decorative image associated with the given user applied to the promotional product.

While various embodiments described herein are directed toward a customized virtual catalog, it would be understood that embodiments are not limited to just a customized virtual catalog. Various embodiments can be used to generate a file including one or more composite images, wherein the file provides an output that can be printed in the form of a flier or other tangible printed form, and that can be mailed or otherwise distributed. In various embodiments, the generated file is used to produce a customized email that can then be emailed to one or more email accounts.

In various embodiments, accessing the customized virtual catalog includes prompting a user for a product image selection and a decorative image selection and displaying a product image (e.g., a photograph) with the decorative image (e.g., a logo graphic or text graphic) placed on it. In various embodiments, prompting the user for a product image selection, decorative image selection, or both product image selection and decorative image selection can be triggered simply by a recognized user accessing the server, or other system, that is providing the functions and features associated with the customized virtual catalog. In some embodiments once a user has accessed the server or other system providing the functions and features of the customized virtual catalog, the user can make a request to provide product image selections, decorative image selections, or both, to the server or other system.

Various embodiments feature a network-based application for composite image generation. For the purposes of the present specification, the term "product image" shall be taken to include any image type and can depict any type, shape or construction of product. The term "decorative image" shall also be taken to include any image type, and can depict, for example, any logo, text, pattern, ornamentation, name, symbol, emblem or the like that can be applied to a product.

In some embodiments, the present invention is implemented as a computer-based service that is accessed through the Internet, for example, using a Web browser. The service provides an interface that allows a user to access the customized virtual catalog and to have images of the promotional products displayed to the user accessing the customized virtual catalog having one or more particular decorative images associated with the user applied to the images of the promotional products, wherein each different user accessing the customized virtual catalog has access to a same plurality of promotional products, but each user having the images of the plurality of promotional products decorated with decorative images that are associated with the users accessing the customized virtual catalog.

Throughout the specification, reference is made to "the plurality of promotional products." It would be understood that this phrase can include a plurality of promotional products of a same type or of same kind of promotional product, or a plurality of promotional products that include more than one of a single type or a single kind of promotional product. In addition, any of the embodiments described herein could be applied for use with a single promotional product, including a customized virtual catalog that includes one promotional product. Such a single promotional product can be used, for example, as an advertisement or in promotional materials including the single promotional product.

In some embodiments, the plurality of promotional products viewed by a user accessing the customized virtual catalog are decorated with a decorative image or images associated with a particular client or entity, such as a business or a brand name that is associated with or owned by the client or entity providing the user with access to the customized virtual catalog. In various embodiments, for any given promotional product a default size for the decorative image is used when applying a decorative image to the promotional products. In various embodiments, for any given promotional product a default position is used for placement of the decorative image onto the image of the promotional product. In various embodiments, for any given promotional product necessary warping is applied to the decorative image as applied to the given promotional product based on warping information associated with the given promotional product. In various embodiments, for a given promotional product, a filter is applied to the composite image of the promotional product and to the applied decorative image so as to give the composite image the appearance of having the decorative image applied using a particular manufacturing process, such as but not limited to embroidery.

In various embodiments, a given user is able to select a promotional product, and to select or to even create decorative image information, and to view the composite image including the promotional product decorated with the selected or created decorative image information, all before ordering the promotional product.

FIG. 1A is a diagram of a system 100 according to various embodiments. System 100 includes one or more client devices 102A-N coupled to server 120 through network 110. Client devices 102A-N are not limited to any particular type of devices. In various embodiments, client devices 102A-N include a single client device, or a combination of client devices 102A-N. In various embodiments, the single client device or the combination of client devices includes any combination of types of devices, including but not limited to personal computers (PCs), laptop computers, Personal Digital Assistants (PDAs), cellular telephones, Internet Protocol (IP) televisions, and High Definition (HD) televisions.

Client devices 102A-N include an interface 105. Interface 105 is operable to allow a client device 102A-N to communicate with server 120 through network 110. Interface 105 is not limited to any particular type of interface. In various embodiments, interface 105 is a web browser. In various embodiments, any one or more of client devices 102A-N uses a wireless connection 104 to communicate with network 110. In various embodiments, in instances where a client device included in client devices 102A-N is using the wireless connection 104, interface 105 is operable to facilitate the communications taking place over the wireless connection 104 to and from the given one of client devices 102A-N using the wireless connection 104. It would be understood that the interface 105 in a given client device 102A-N would be operable to allow the given client device 102A-N to communicate with server 120 through network 110, and thus in some embodiments is a different type of interface as would be provided in another and different one of client devices 102A-N.

In various embodiments, client devices 102A-N include a display 106. Display 106 is not limited to any particular type of display, and can include any type of display operable to visually display some portion of the customized virtual catalog. In various embodiments, display 106 is operable to allow inputs to be made at a client device, by way of illustration but not limited to having display 106 include a touch screen.

In various embodiments, any one of client devices 102A-N is operable to access a customized virtual catalog provided at server 120. In various embodiments, server 120 is operable to provide graphical images included as part of a customized virtual catalog to any one or more of client devices 102A-N. In various embodiments, the customized virtual catalog is provided as one or more web pages accessible by one or more of client devices 102A-N. In various embodiments, server 120 is operable to provide a different and customized virtual catalog to each of the different client devices 102A-N.

In various embodiments, a customized virtual catalog is accessed through one of client devices 102A-N that run interface 105 to provide graphical interfaces for a user to effectively access the customized virtual catalog, including the use of the composite image generation service provided at server 120. The client devices 102A-N communicate with the server 120 via a network 110, which in some embodiments includes the Internet. Server 120 includes in various embodiments any combination of such components including a web server 130, an application server 140, and a database server 190. It will be appreciated that these servers can run on other machines that are accessible by server 120.

In various embodiments, database server 190 is coupled to or includes one or more databases 198. Databases 198 include but are not limited to any combination of product image database 182, product receiving database 184, product database 186, logo database 188, photo archive database 192, customer database 194, and order database 196. In various embodiments, databases 198 are also stored at the server 120. However, it would be understood that one or more of databases 198 can be stored at other machines and other servers, and database data can be uploaded to the server 120 when necessary.

The application server 140 contains visualization server 150 that includes compositing engine 160, product image conversion engine 170, and artwork creation engine 180. In various embodiments, compositing engine 160 generates a composite image based on a first image provided as a promotional product in the customized virtual catalog, and a second image associated with a particular user who is accessing the customized virtual catalog. A first image is, for example, uploaded from a product manufacturer and represents a product depicted in the first image. A file associated with the first image is received at a product receiving database 184. The file includes information associated with the promotional product that is associated with the file, including any combination of dimensional information, choices of colors and materials available for the promotional product, information regarding what manufacturing processes are available for decorating the promotional product, warping information related to how to warp a decorative image onto one or more portions of the images of the promotional product associated with the file, and default areas where decorative images can be applied to the images of the promotional product.

In various embodiments, the file is processed by the product image conversion engine 170 for storage in a product database 186. In various embodiments, the file includes data representing one or more images of the promotional product. In various embodiments, the data representing the one or more images of the promotional product are stored in the product image database 182. In various embodiments, the information associated with the file and the promotional product is stored in the product database 186.

The image for the promotional product can be obtained from the any number of sources. For example, an operator of a Web site that is it supported by the server 120 can employ an internal photographic (or art) department that is responsible for generating images of products that are supplied, together with pertinent product information, to the Web site operator by manufacturers of such products. In various embodiments, these internally generated photographs are stored in a photo archive database 192.

In various embodiments, the decorative image, or "second image" is any image that can be stored or uploaded into visualization server 150, and applied in a composite image to an image of at least one promotional product. In various embodiments, the decorative images are image files that are uploaded from network 110 and stored in logo database 188. The image files are not limited to any particular type or format of files, and can include any types and formats of files operable to provide data that can be utilized as a decorative image by visualization server 150. In various embodiments, the image file for the decorative image is not limited to any particular format, and in various embodiments, can be any of the following formats: Joint Photographic Experts Group format (.jpg), Microsoft Windows™ Bitmap formatted image (.bmp), and Tagged Image File Format (.tif).

In various embodiments, the artwork creation engine 180 is operable to detect information associated with the image file, such as but not limited to the number of colors and transparent areas included in an image file for a decorative image. In various embodiments, visualization server 150 generates displays of the image files on a special background operable to allow a user to edit the image file. In various embodiments, the image file including the decorative image and any associated decorative file information is stored in the customer database 194 so as to associate the image file and the decorative image with a particular client.

In various embodiments, the second image is modified by the artwork creation engine 180 according to the user's blocks in the Web browser. These image conversion processes are described in detail below. The database server 190 that communicates to the application server 140 contains databases used for the composite image generation. As stated above, the databases may be stored at another machine and accessed by the database server 190. Furthermore, the database server 190 may run at another machine and communicate with the application server 140 via the network 110.

In various embodiments, in order to produce a composite image, the first and the second images, for example product image and logo image respectively, are processed for use by the compositing engine 160 of the visualization server 150.

While the below embodiments of the present invention are in some instances described as utilizing "logo images" or "logos," it will be appreciated that embodiments are not limited to the utilization of such logo images, and can employ a decorative image representing any decoration (e.g., a graphic, logo or text) that may be applied to a base product representing an undecorated promotional product.

In various embodiments, compositing engine 160 is operable to generate each of the composite images included in the customized virtual catalog, each composite image including an image of a base product rendered to include a decoration including a decorative image applied to the image of the base product. In various embodiments, the decorative image is applied to a default position on the image of the base product, and using a default size of the decorative image for a given base product. In various embodiments, the default size is based on decoration areas information associated with a given base product, and can be different for different base products for any given and same decorative image. In various embodiments, the decorative image is applied using warping information to warp the decorative image onto the image of the base product in the composite image. In various embodiments, the decorative image is applied using a filter to give the decorative image the appearance in the composite image of having been applied to the actual base product using a particular manufacturing process.

In various embodiments, the decorative image is "pre-rendered" in some form so that the load time is faster for a user accessing the customized virtual catalog.

In various embodiments, compositing engine 160 is operable to generate each of the composite images based on information related to the base product, information related to the decorative image being applied, and instructions stored in the imprint algorithm 165.

In various embodiments, a client accessing the customized virtual catalog is provided options to edit one or more parameter of a composite image, including but not limited to logo position, color of base product and decorative image, logo size, filtering used in the composite image representing the manufacturing process used to apply the logo to the actual base product depicted in the composite image, and any text or other graphical features included in the logo. As part of any editing performed on a composite image, compositing engine 160 is operable to re-generate a new composite image based on the edits performed.

In various embodiments, before a product image and a logo image can be utilized by the composite image generator, in one embodiment, each is formatted as a raster file. It will be appreciated that the processing of the photo images need not occur at the server 120, and can take place at another location with the processed product images that can then be, for example, uploaded to the server 120 via a network or generated by a Web site operator that operates the server 120. In various embodiments, a product image file depicting a product is submitted by a manufacturer of the product. For example, the product manufacturer submits a high-resolution product photo file, such as a file of 1.3 mega-pixel resolution.

Figure 1B:
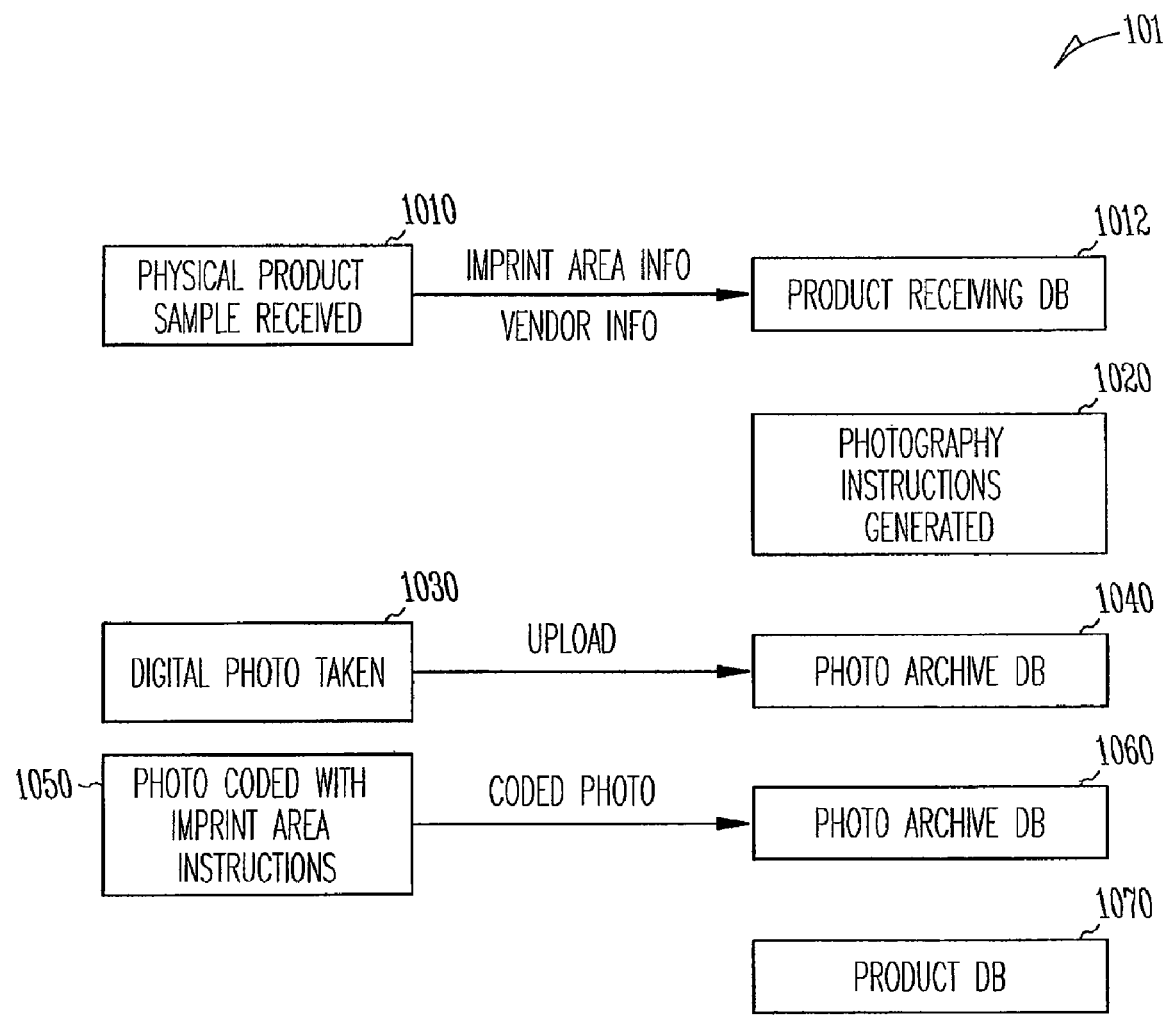
FIG. 1B is a chart illustrating methods of receiving and storing information related to promotional products.

FIG. 1B is a chart 101 illustrating methods of receiving and storing information related to promotional products. In various embodiments, at block 1010 the manufacturer submits a physical product sample with the product information, including any combination of size, imprint area, and warping information, that is stored in product receiving database 1012 by the compositing engine 160. In various embodiments, the product receiving database 1012 is product receiving database 184. Upon generation of photography instructions at block 1020, the digital photograph of the product is taken at block 1030 by, for example, a Web site operator that operates the server 120. The digital photograph is then uploaded to photo archive database at block 1040, which in various embodiments is the photo archive database 192. The photo is coded with imprint instructions at block 1050, and the coded photo is stored in photo archive data base at block 1060, which in some embodiments is the product image database 182.

In various embodiments, the product image processing in done utilizing a commercially available software package, such as Adobe Photoshop™ (available from Adobe Systems of San Jose, Calif.) on Windows™ operating system (available from Microsoft Corporation of Redmond, Wash.). In various embodiments, an alpha channel is defined using the selection tools in Photoshop™, and, at the same time, the diameter of the product is set and the warp ratio is automatically calculated based on the diameter of the product. The product photo export plug-in generates the product image file and product thumbnail file and saves it in the product image database, or saves it for uploading to the product database 1070 by the product image conversion engine 170.

Referring again to FIG. 1A, in various embodiments, the product image database 182 is part of a product database 186 where the product images are associated with a product. However, in other embodiments it can be a separate product image database associated with a product database. In an embodiment where the product images are processed at another system, the processed files are uploaded to the product image database 182. The product image file may be a .png file containing a high-resolution product image. It will be appreciated that product image files in addition to or other than the above image files may also be generated by the product photo export plug-in.

In various embodiments, information associated with each user accessing the customized virtual catalog as provided at server 120 has client information stored in customer database 194, and associated with the user. This client information includes at least one default decorative image that is used to decorate one or more of the promotional products displayed to the user when the user accesses the customized virtual catalog. In various embodiments, a given user can have a plurality of decorative images associated with the given user and displayed on different particular ones of the promotional products as these promotional products are displayed to the given user when displaying the customized virtual catalog to the given user. In various embodiments, every one of the promotional products displayed when a given user accesses the customized virtual catalog is decorated using a decorative image associated with the given user. In various embodiments, every one of the promotional products displayed when a given user accesses the customized virtual catalog is decorated using a decorative image associated with the client device through which the given user is obtaining access to the customized virtual catalog.

In operation, a user identified as a "client" uses one of client devices 102A-N to access the customized virtual catalog through network 110. In various embodiments, the client is identified by using a password or other identification information during a login process to gain access to the customized virtual catalog. In various embodiments, the client is identified by identifying the particular client device 102A-N through which the client is obtaining the access to the customized virtual catalog. Once identified, information from the customer database 194 is used to determine which decorative images are associated with the client, and along with other information including client settings and default settings for the client, a customized virtual catalog is generated to provide one or more images of promotional products decorated with decorative images associated with the client. The generated images are provided over the network for viewing by the client.

In various embodiments, the client is provided images and screens that allow the client to further edit the images, and to modify various client settings and client information. In various embodiments, the client is provided screens and options on screens operable to allow the client to get pricing information related to selected promotional products decorated with decorative images, and to place orders for promotional products decorated with one or more decorative images. In various embodiments, information related to one or more client's orders is stored in order database 196.

By having customer information stored for each individual user accessing the customized virtual catalog as provided at server 120, each user can be presented with a unique customized virtual catalog that includes images of promotional products decorated with one or more particular and different decorative images, the decorative images associated individually with the particular user accessing the customized virtual catalog.

In various embodiments, server 120 includes a processor and memory unit 142, wherein the memory includes any type of computer readable medium, such as a computer memory, operable to store instructions that when executed by the processor, perform any of the methods and any of the operations described herein.

It would be understood that obtaining data related to promotional products, such as shown in FIG. 1B, is illustrative and not limiting. In various embodiments, images of promotional products can be obtained from other sources, including websites and existing databases, and processed and stored for use in the customized virtual catalog. Similarly, the decorative images are not limited to being obtained from a particular source, and can be obtained from any source, including but not limited to a website or an existing database storing one or more decorative images.

It would be understood that it is not necessary in every embodiment of a customized virtual catalog that the information used to store and to provide the images of the promotional products, to store and to provide the decorative images used to decorate an image of any promotional product, or that the composite images themselves be stored in a database, or otherwise stored for later use within a system operable to provide the customized virtual catalog. In various embodiments, the information used to store and to provide any one or more of promotional product images, any one or more of the decorative images, any one or more of the composite images, or any combination of these can be retrieved from sources outside the system used to generate the customized virtual catalog, and displayed as part or all of a customized virtual catalog without storing any, or at least without storing on the system some part of, the information providing in the customized virtual catalog.

Figure 2:
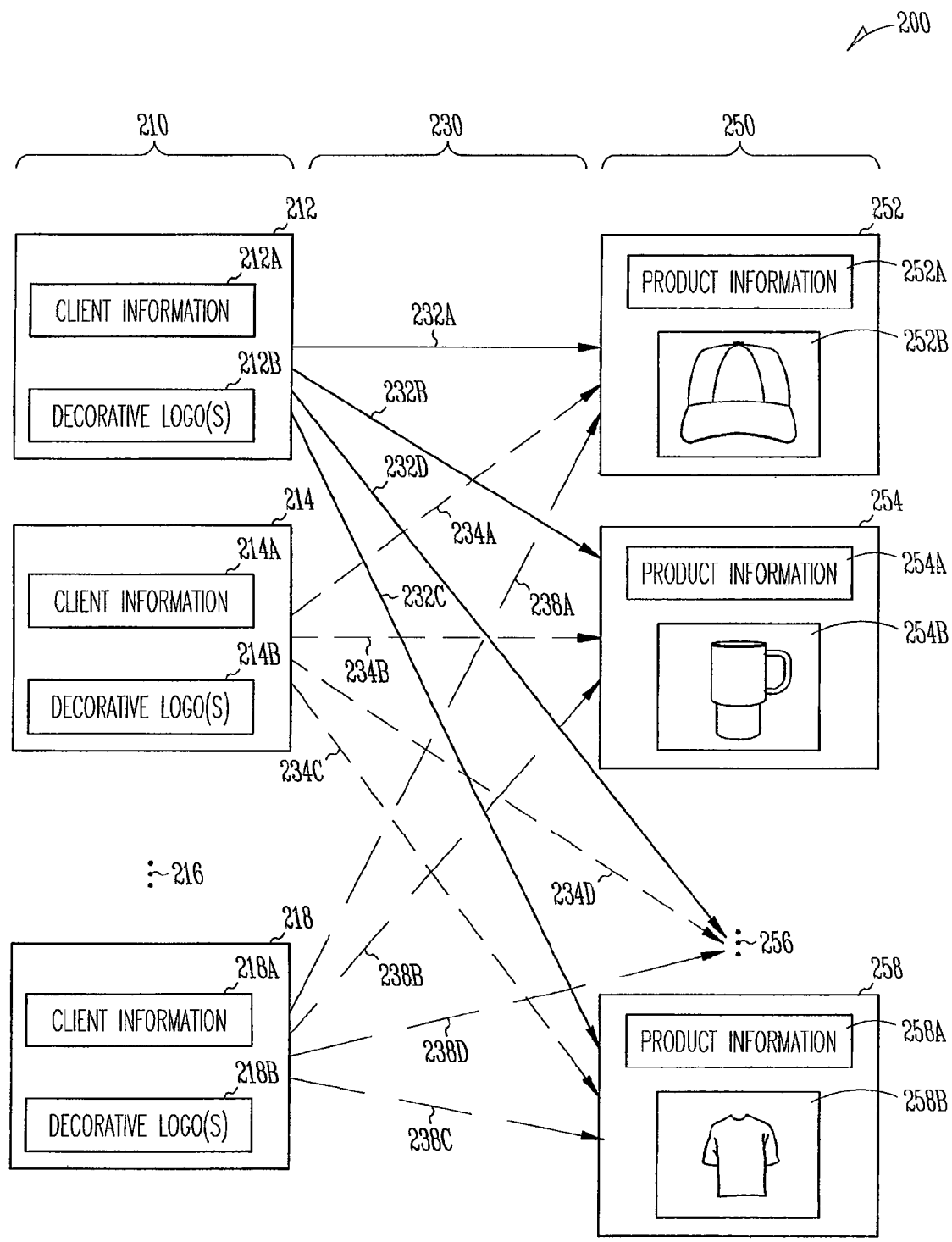
FIG. 2 is a chart illustrating various relationships between client information and product information according to various embodiments.

FIG. 2 is a chart 200 illustrating various relationships between client information and product information according to various embodiments. Chart 200 includes client information blocks 210, product information blocks 250, and relationships 230. In various embodiments, when a client accesses the customized virtual catalog, a given one of the client information blocks 210 associated with the client making the access is used to generate composite images of some, or in various embodiments all, of the promotional products included in product information blocks 250 based on relationships 230.

The client information blocks 210 are used to determine which decorative logos are associated with the client making access to the customized virtual catalog, and relationships 230 are then used to determine which of the decorative logos associated with the client making the access are to be used in generating each of the composite images of the various promotional products associated with the product information blocks 250 that are to be displayed to the client making the access.

In various embodiments, the generated composite images are available for display and viewing by the client making the access as a customized virtual catalog, wherein any or all of the promotional products associated with the product information blocks 250 are available for viewing by the client and are displayed to the client as having the image of the promotional products decorated using one or more of the decorative logos associated with the client.

In various embodiments, client information blocks 210 include any number of client information blocks 212, 214, and 218, wherein the number of client information blocks is not limited to any particular number of blocks, as represented by dotted line 216. In various embodiments, each of client information blocks 212, 214, and 218 includes client information and one associated decorative logo, or a plurality of decorative logos. By way of illustration, client information block 212 includes client information 212A, and one or more associated decorative logos 212B, client information block 214 includes client information 214A, and one or more associated decorative logos 214B, client information block 218 includes client information 218A, and one or more associated decorative logos 218B. It would be understood that any client information blocks represented by dotted line 216 also include client information and one or more associated decorative logos.

Client information is not limited to any particular types of information, and includes any data associated with or generated for a client authorized to access the customized virtual catalog through a system, such as but not limited to system 100 as shown in FIG. 1A. In various embodiments, client information such as client information 212A, 214A, and 218A includes information associated with a particular client who is authorized to access the customized virtual catalog. In various embodiments, the client information 212A, 214A, and 218A includes information associated with a particular client device that is authorized to access the customized virtual catalog, such as but not limited to the client devices 102A-N as shown as part of system 100 in FIG. 1A.

Returning to FIG. 2, the client information blocks 212, 214, and 218 each include one or more associated decorative logos 212B, 214B, and 218B respectively. Decorative logos are not limited to any particular type of logo, and are intended to be construed broadly to include any type of logo, graphic design, text, or colors that are possibly applied to any type of promotional product. By way of illustration, decorative logos can include a trademark. In various embodiments, the decorative logos can include a company logo. In various embodiments, the decorative logos include a slogan, or other text. In various embodiments, the decorative logos include a combination of a graphic image and text.

In various embodiments, the data included in client information 212A, 214A, through 218A is stored in a database, such as but not limited to, customer database 194 as shown in FIG. 1A. In various embodiments, the data included in decorative logos 212B, 214B, through 218B is stored in a database such as, but not limited to, logo database 188 as shown in FIG. 1A.

Product information blocks 250 include any number of product information blocks 252, 254, and 258, wherein the number of product information blocks is not limited to any particular number of blocks, as represented by dotted line 256. In various embodiments, each of product information blocks 252, 254, and 258 includes product information associated with at least one promotional product, or at least one type of promotional product. By way of illustration, product information block 252 includes product information 252A, and one or more product images 252B associated with baseball hats. By way of further illustration, product information block 254 includes product information 254A, and one or more product images 254B associated with drinking mugs, and product information block 258 includes product information 258A and one or more product images 258B associated with Tee-shirts.

It would be understood that product information blocks 250 are not limited to any particular type or types of products, and in various embodiments can include any type of product that is decorateable in order to create a decorated promotional product. It would also be understood that different types of promotional products can be represented in a single product information block. By way of example, product information block 252 includes a number of baseball hats that are made in a same style, but are available in a variety of colors, or that are available in a variety of styles, or that are available in a variety of materials, or any combination of these. It would be further understood that different varieties of the baseball hats illustrated in product information block 252 could also be represented in two or more different product information blocks, wherein each of the blocks represents some sub-category of the baseball hats, such as sub-categories based on the materials the baseball hats represented in the product block are manufactured from.

Relationships 230 represent links between one or more of client information blocks 210 and product information blocks 250. In various embodiments, relationships 230 determine links between the one or more decorative logos associated with a client and the one or more product information blocks 250. In various embodiments, the links are used to determine which of the decorative logos for a given client information block 210 are to be applied to the one or more product information blocks 250 in order to generate the composite images a given client will see when accessing the customized virtual catalog.

By way of illustration, when a client associated with client information block 212 accesses the customized virtual catalog, relationship 232A is used to determine which of decorative logos 212B will applied to the promotional product or products associated with product information block 252. In various embodiments, relationship 232B is used to determine which of decorative logos 212B will applied to the promotional product or products associated with product information block 254. In various embodiments, relationship 232C is used to determine which of decorative logos 212B will applied to the promotional product or products associated with product information block 258. It would be understood that additional relationships 232D could be used to determine which decorative logos 212B will be applied to any additional promotions products associated with product information blocks represented by dotted line 256.

By using relationships 232A-C, and 232D if present, a customized virtual catalog can be generated for the client associated with client information block 212 wherein images of any or all of the products represented by product information blocks 250 are available to be viewed by the client having the client's decorative logo or logos applied to each of the products, as defined by the relationships 232A-C and 232D. In various embodiments, relationships 230 link each of two or more different decorative logos included in a particular client information block 210 to two or more different product information blocks 250. By way of illustration, relationship 232A links a first decorative logo (not specifically shown in FIG. 2) included in decorative logos 212B with the baseball hats of product information block 252, and links a second and different decorative logo included in decorative logos 212B with the drinking mugs of product information block 254. Based on these illustrative linkings, when the client associated with client information block 212 accesses the customized virtual catalog, the baseball hats associated with product information block 252 will appear decorated with the first decorative logo, and the drinking mugs associated with product information block 254 will appear decorated with the second decorative logo.

It would be understood that relationships 230 are operable to link one or a plurality of decorative logos to any one or any combination of products associated with product information blocks 250. In various embodiments, relationships 234A, 234B, and 234C link client information block 214 and logos included in decorative logos 214B with the promotional products associated with product information blocks 252, 254, and 258 respectively. Relationships 238A, 238B, and 238C link client information block 218 and one or more of the decorative logos 218B with the promotional products associated with product information blocks 252, 254, and 258 respectively. If additional product information blocks 256 are present, relationship 234D links one or more of decorative logos 214B to these product information blocks. If additional product information blocks 256 are present, relationship 238D links one or more of decorative logos 218B to these product information blocks.

In various embodiments, a given link includes instructions regarding variations for a decorative logo for different versions of a product within a given product information block 250. By way of illustration, a given logo in decorative logos 212B associated with client information block 212 includes a slogan comprised of text. The text is normally depicted as being black in color. Relationship 232A links this decorative logo including text to the baseball hats of product information block 252. The baseball hats are available in a variety of colors, including black. Since black text might not show up well or at all on a black baseball hat, relationship 232A in various embodiments, includes information associated with products of a particular color, such as the default black colored text should not be applied to black baseball hats, but to use a different color such as red, to display the decorative logo on the image of the black baseball hat.

By using relationships 230, each client represented by client information blocks 212, 214, 218, and dotted line 216 when present, when accessing the customized virtual catalog will have custom views of one or more of the promotional products associated with product information blocks 252, 254, 256, and 258 that include the promotional product images decorated based on the decorative logos for the particular client and based on the relationships 230 for the particular client.

Figure 3:
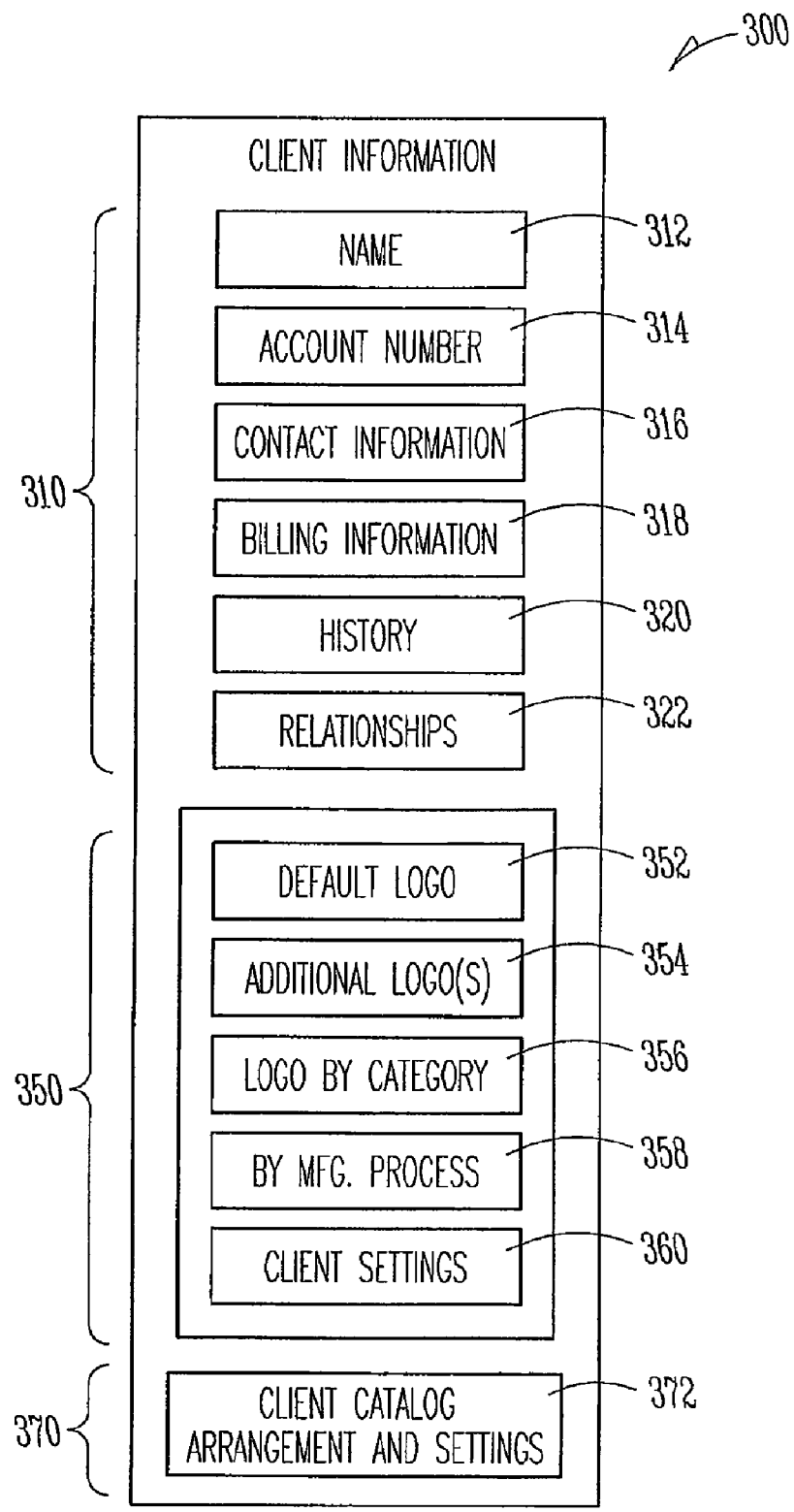
FIG. 3 is an illustration of a client information block according to various embodiments.

FIG. 3 is an illustration of a client information block 300 according to various embodiments. Client information block 300 is not limited to any particular type of client information block, and in various embodiments is one or more of client information blocks 210 as shown in FIG. 2. In various embodiments, client information block 300 includes data stored in a database, such as but not limited to customer database 194 as shown in FIG. 1A.

Returning to FIG. 3, client information block 300 includes a client information portion 310, and a decorative logo portion 350. Client information portion 310 is not limited to any particular type of information, and includes in various embodiments any information associated with a client who is associated with client information block 300. In various embodiments, client information portion 310 includes any combination of a client name 312, an account number 314, contact information 316, billing information 318, history 320, and relationships 322.

In various embodiments, client name 312 is a name of the client, including a person's name, or a name of an entity such as a business or a corporation, that is associated the client information block 300. In various embodiments, client name 312 is a name of a client device, such as a particular computer, that has access to the customized virtual catalog and is associated with client information block 300. By way of illustration, client name 312 can be associated with a particular kiosk located, for example, in a particular public location or in a business, wherein anyone using the kiosk can access the customized virtual catalog using the kiosk and have the client information and the settings associated with the client information block 300 as associated with the kiosk. In such embodiments, the setup of the kiosk might be made so as to provide a customized virtual catalog having all the promotional products decorated using a default logo associated with the location or the business where the kiosk is located. This can be done for example to promote sales of products offer by the business where the kiosk is located.

Account number 314 is not limited to any particular type of account number, and includes any type of identification information associated with and used to identify the client associated with client information block 300. Contact information 316 is not limited to any particular type of contact information, and includes any type of information useful for contacting the client associated with client information block 300, including but not limited to mailing addresses, telephone and cell phone numbers, and email addresses. Billing information 318 is not limited to any particular type of billing information, and includes any information used to track and perform billing of the client associated with client information block 300. Billing information includes but is not limited to mailing addresses that can be the same or different for the addresses provided in the contact information 316, account numbers for accounts such as checking, savings, credit or debit accounts, wherein the client has set up arrangements for payment for products or services received by the client associated with the client information block 300.

History 320 is not limited to any particular type of history, and includes any information related to the history of the client associated with client information block 300. In various embodiments, history 320 includes data indicative of the time and duration of visits to the customized virtual catalog by the client associated with client information block 300. In various embodiments, history 320 includes data indicative of the purchases made by the client associated with client information block 300 while accessing the customized virtual catalog. Information related to purchases includes but is not limited to price, quantity, and type of products included in any purchase made by the client associated with client information block 300.

In various embodiments, the information stored in history 320 can be used to further customize the customized virtual catalog as the customized virtual catalog is being accessed by the client. By way of illustration, if the data stored in history 320 for a given client information block 300 indicates that the client usually purchases lower priced items, the customized virtual catalog can be arranged to feature such low priced items in, for example, the first pages presented to the client when the client accesses the catalog. It would be understood that the data included in history 320 is not limited to any particular use, and is made available and can be used in any manner to alter and customize the presentation of the customized virtual catalog for the client associated with the client information block that includes the data stored in history 320.

Relationships 322 is not limited to any particular type of relationships, and includes any relationships between decorative logos included in the decorative logo portion 350 of client information block 300 and any one or a plurality of promotional products included in a customized virtual catalog. In various embodiments, relationships 322 are any one of the relationships 232A-D, 234A-D, or 238A-D as shown in FIG. 2. In various embodiments, relationships include a mapping between the one or more logos in decorative logo portion 350 and the plurality of products included in the product information blocks included in a customized virtual catalog.

In various embodiments, relationships 322 include the default relationships wherein a given decorative logo included in decorative logo portion 350 is applied by default to all of the promotional products included in a customized virtual catalog when accessed by the client associated with client information block 300. In various embodiments, relationships 322 include different linking between a plurality of decorative logos included in the decorative logo portion 350 and various products included in a customized virtual catalog.

In various embodiments, relationships 322 includes additional information regarding which decorative logos, or which versions of the decorative logos, can be applied to which promotional products included in the customized virtual catalog. By way of example, a given logo can in some instances be applied to an actual promotional product using embroidery, but such a process is not available with respect to other types of promotional products, say by way of illustration, ceramic coffee mugs. In another illustration, certain colors for logos will not properly show up on a certain color, for example, a same color of promotional product. Data stored in relationships 322 includes data associating different logos, different processes for applying logos, and different variations of logos, including different variations of color for a given logo, as the relationship of these to one or more of the plurality of promotional products available for display to the client as part of the customized virtual catalog.

The type of data included in relationships 322 is not limited to any particular type of data, and includes any type of relationships between logos and promotional products that is useful in controlling the combinations used in the generating of the composite images provided in the customized virtual catalog.

Decorative logo portion 350 includes one or more decorative logos that are applicable for the generation of the composite images displayed in a customized virtual catalog. In various embodiments, decorative logo portion 350 includes a default decorative logo 352. In various embodiments, unless otherwise specified by the relationships 322, the default decorative logo 352 is the decorative logo used to decorate the images of the promotional products included in the customized virtual catalog when the customized virtual catalog is accessed by the client associated with client information block 300.

In various embodiments, decorative logo portion 350 includes one or more additional logos 354. Additional logos are not limited to any particular type of logos, and include any types of decorative logos operable to be used to decorate promotional products. In various embodiments, the logo by category block 356 includes information specifying which logos, such as the default decorative logo 352 and any of the additional logos 354, are to be used to decorate particular categories of promotional products. By way of illustration, a default decorative logo 352 is specified for use in the generated composite images in the customized virtual catalog for all categories of clothes, such as baseball hats and Tee-shirts, and a given one of the additional logos 354 is designated for use in the generation of the composite images of a given category of promotional products, by way of illustration drinking mugs, when the customized virtual catalog for the client associated with client information block 300 is being accessed.

In various embodiments, decorative logo portion 350 includes one or more indications of "by manufacturing process" at block 358. The by manufacturing process block 358 includes information associated with decorative manufacturing processes, and which promotional products are able to be decorated using the given manufacturing process. By way of illustration, embroidery is a manufacturing process by which certain promotional products, such as baseball hats and Tee-shirt, can have a decorative logo applied to the actual product. However, embroidery is not generally a manufacturing process that can be used to apply a decorative logo to other some other types of promotional products, such as a ceramic drinking mug. In some instances, a plurality of different manufacturing process can be used on a same type of promotional product. By way of illustration, both embroidery and silk screening process can be used to apply a decorative logo to a shirt. Therefore, by manufacturing process block 358 includes information related to the manufacturing processes that are to be applied as filters when generating various composite images in the customized virtual catalog for the client associated with the client information block 300.

In various embodiments, decorative logo portion 350 includes client settings 360. Client settings 360 are not limited to any particular types of client settings, and include settings the client has saved, including but not limited to, which of the decorative logos in decorative logo portion 350 is to be the default logo, and which decorative logos are to be used to generate the images of the promotional products displayed when the customized virtual catalog is accessed by the client.

In various embodiments, client information block 300 includes a client catalog arrangement and settings portion 370 including client catalog arrangements and settings 372. Portion 370 includes information related to aspects of how the customized virtual catalog is to be displayed to the client when the client accesses the customized virtual catalog. In various embodiments, a default setting is used to determine the arrangement and the order of the promotional products as they are displayed to the client when the client is accessing the customized virtual catalog. By way of illustration, the default arrangement and order of the promotional product includes the promotional products being displayed and grouped by categories. By way of illustration, a first category is baseball hats, and the baseball hats are grouped together and displayed all together to the client showing the various colors and various styles of baseball hats decorated using the client's decorative logos. A second category of promotional products is drinking mugs, and the various styles and colors of drinking mugs are displayed in the client's virtual catalog grouped together and decorated using the client's decorative logos. Groupings categories of promotional products in the customized virtual catalog includes having all of the same category of promotional products in a same category displayed on a same page, or on contiguous pages when displayed to the client.

In another illustration, promotional products are sorted by price, and are displayed in some relationship to provide, for example, promotional products displayed from the lowest priced to the highest priced items, when displaying the customized virtual catalog to the client. By way of illustration, inexpensive promotional products, such as writing pens, are displayed in the first section or pages of the customized virtual catalog, then the next most expensive items, such as Tee-shirts, are displayed on later pages, and then even more expensive items, such as collared shirts, are displayed on later pages of the customized virtual catalog. In such embodiments, items within a same category may appear in different portions of the customized virtual catalog due to price differences based on the manufacturing process used to decorate the promotional product. By way of illustration, a baseball hat decorated using screen printing has a first price, wherein the same baseball hat decorated using a more expensive manufacturing process, such as embroidery, has a second and higher price. Therefore, when the customized virtual catalog is displayed using an arrangement and setting based on price, the same baseball hat can appear in two different places in the customized virtual catalog, and having a different price for the two separate instances of the baseball hat.

In various embodiments, client catalog arrangements and settings 372 stores information related to how the customized virtual catalog, including the order of product presentation, will be presented when a client associated with client information block 300 accesses the customized virtual catalog. In various embodiments, one or more of the settings stored in client catalog arrangements and settings 372 is configurable by the client, and can be saved in client catalog arrangements and settings 372 for use during future accesses to the customized virtual catalog by the client.

In various embodiments, a customized virtual catalog is presented to the client accessing the customized virtual catalog wherein any new promotional products that were not previously presented to the client as of the client's most recent access to the customized virtual catalog are set to appear first in the customized virtual catalog upon the next access by the client. In various embodiments, tracking information regarding which promotional products the client has and has not seen are stored in client catalog arrangements and settings 372. In various embodiments, upon an access to the customized virtual catalog, a determination is made as to which promotional products are new to the client, and these promotional products can be displayed on the first pages of the customized virtual catalog when the access is made.

In various embodiments, client catalog arrangement and settings portion 370 includes client preferences related to the customized virtual catalog. By way of illustration, portion 370 includes categories of promotional products the client always wants to see displayed first. In another illustration, portion 370 includes categories of promotional products the client does not wish to have included in the customized virtual catalog being displayed when the client accesses the customized virtual catalog.

In various embodiments, portion 370 includes information related to the type or the capacity of a display device used by the client accessing the customized virtual catalog. By way of illustration, portion 370 can include information related to the size of the display screen used by the client to access the customized virtual catalog. Thus, the arrangement and the layout of the customized virtual catalog can be organized and scaled to fit the screen size of the display being used by the client. Information included in portion 370 includes but is not limited to any combination of information indicating a client device's display screen resolution, color capabilities, and memory size. Any of these parameters can be used to determine the most efficient or most desirable format for a client to receive and view the customized virtual catalog.

In various embodiments, portion 370 includes information related to any pricing particular to the client associated with client information 300. By way of illustration, portion 370 can include information when the client has pre-negotiated specific pricing related to one or more of the promotional products. In various embodiments, the special pricing is displayed to a user accessing the customized virtual catalog and who is associated with the client information 300 so that the user can see that they are being provided the special pricing. In various embodiments, the special pricing is automatically calculated into the pricing provided to the user accessing the customized virtual catalog and who is associated with client information 300 whenever the user makes purchases covered by the special pricing.

Figure 4:
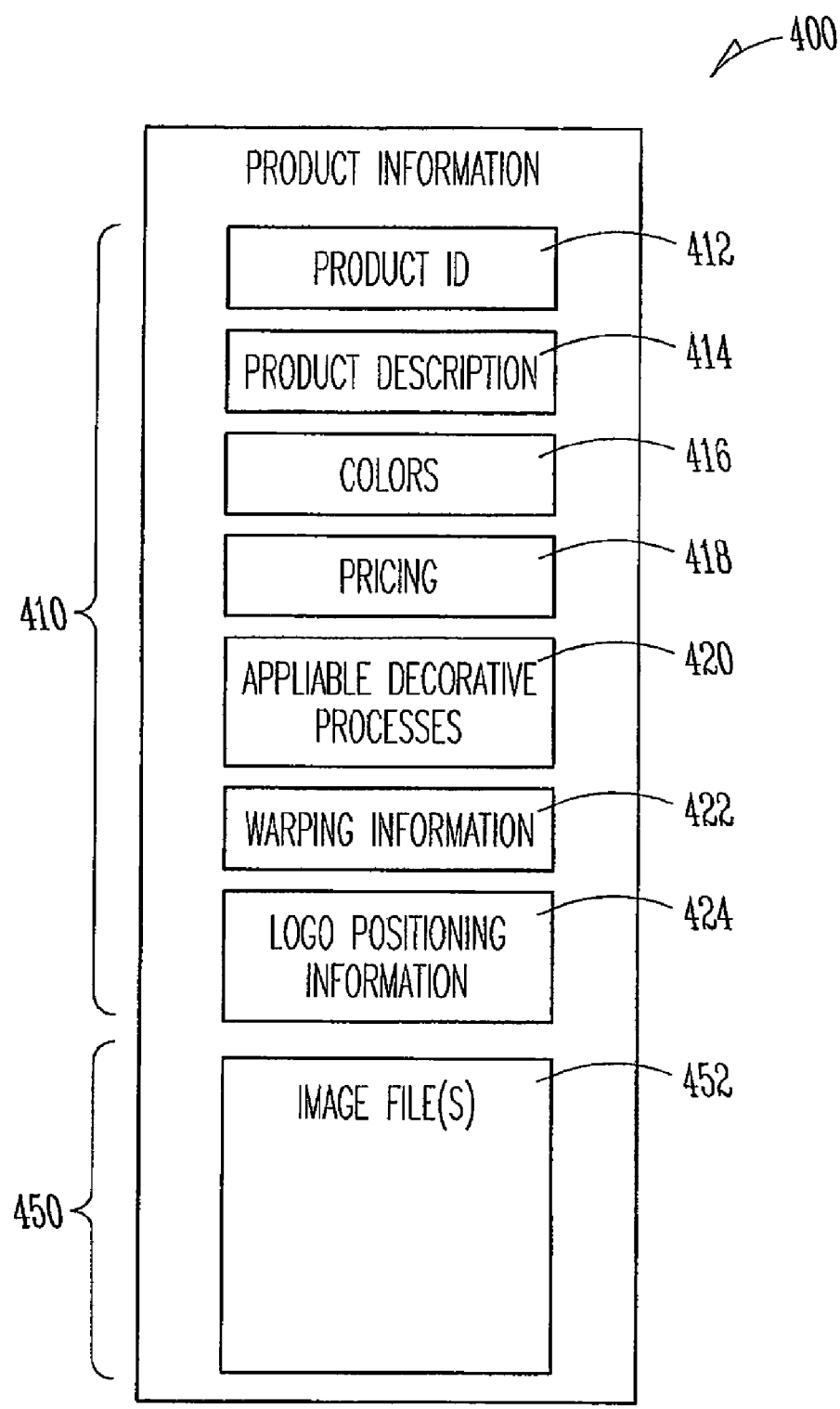
FIG. 4 is an illustration of a product information block according to various embodiments.

FIG. 4 is an illustration of a product information block 400 according to various embodiments. Product information block 400 is not limited to any particular type of product information block, and includes any product information block operable for use in generating the composite images of promotional products for a customized virtual catalog. In various embodiments, the product information block 400 is any one of the product information blocks 250 as shown in FIG. 2. In various embodiments, product information block 400 is stored in a database, such as but not limited to product database 186 as shown in FIG. 1A.

Returning to FIG. 4, in various embodiments, product information block 400 includes a product information portion 410, and an image file portion 450. Product information portion 410 is not limited to any particular type of information, and includes in various embodiments any information associated with a promotional product that is available for display a part of a customized virtual catalog. In various embodiments, product information portion 410 includes any combination of a product identification (ID) 412, product description 414, colors 416, pricing 418, applicable decorative processes 420, warping information 422, and logo positioning information 424.

Product identification 412 is not limited to any particular type of product identification, and can include any type of data used to identify the promotional product associated with product information block 400. In various embodiments, product identification 412 includes a plurality of different product identifications, wherein the different product identifications are used to differentiate between variations of a promotional product, such as but not limited to different styles, different materials, and any other differentiating feature of the promotional product associate with product information block 400. In various embodiments, the product identification 412 is the data included in the mapping used by relationships 322 in a client information block 300 of FIG. 3 to map the client logos of client information block 300 to the promotional products associated with product information block 400.

Referring again to FIG. 4, product description 414 is not limited to any particular type of description, and can include any descriptive text, graphics, or other data that is useful in describing the promotional product associated with product information block 400. In various embodiments, some portion or all of the description included in product description block 414 appears in the customized virtual catalog when the product associated with product information block 400 is displayed to a client.

In various embodiments, colors 416 includes information related to the colors that a promotional product associated with product information block 400 are available in. In various embodiments, data stored in colors 416 is used to generate multiple composite images of a same promotional product, wherein each of the multiple composite images are displayed using a different color based on the data stored in colors 416.

In various embodiments, pricing block 418 includes pricing information for the promotional products associated with the product information block 400. In various embodiments, pricing information includes a base price for the promotional product in an undecorated state. In various embodiments, the pricing information includes a finished price for a promotional product decorated with a decorative image (decorative logo). In various embodiments, pricing information includes different prices for a promotional products depending on what manufacturing process is used to decorate the finished and decorated promotional products. In various embodiments, pricing includes different pricing based on a quantity of the promotional product that is ordered.

In various embodiments, applicable decorative processes 420 includes data related to which types of processes are applicable to the actual decorating of the promotional products associated with product information block 400. Applicable decorative processes are not limited to any particular types of processes. In various embodiments, applicable processes include any manufacturing processes useful for decorating promotional products, including but not limited to silk screening, painting, application of decals, engraving, embossing, and embroidery. For various products, a plurality of different type of manufacturing process can be used to decorate a promotional product associated with product information block 400. As further described herein, in various embodiments, a client accessing the customized virtual catalog can select which of a plurality of manufacturing processes the composite image generated in the customized virtual catalog should depict, and filtering will be applied to the generated composite image of the promotional product so as to have the appearance of the promotional produce having been decorated using the selected manufacturing process.

In various embodiments, warping information 422 includes data useful for warping the image of the decorative logos onto the image of the promotional product associated with product information block 400. In various embodiments, necessary warping is applied by the compositing engine, such as compositing engine 160 as shown in FIG. 1A, when generating composite image. The compositing engine places the decorative logo image on the image of the promotional product according to the warp ratio. The warping may be cylindrical or spherical, however, it will be appreciated that the warping ratio may be further defined to address other types of product image topography, e.g. undulating, cubist, etc. In various embodiments, warping information 422 includes a warp ratio. In various embodiments, the warp ratio is automatically calculated based on one or more dimensions associated with the promotional product, for example but not limited to, the diameter of the promotional product.

In various embodiments, logo positioning information 424 includes data related to an area on the promotional product where, by default, an image of the decorative logo used to decorate the promotional product will be positioned in a generated composite image including the promotional product associated with product information block 400. In various embodiments, the logo positioning information 424 defines the geometrical area, such as but not limited to a square, a rectangle, a circle, or a triangle, where the logo will be positioned by default when generating the composite image of the promotional product associated with product information block 400. In various embodiments, the logo positioning information 424 defines a center point around which a decorative logo is centered when generating the composite image of the promotional product associated with product information block 400.

Image file portion 450 includes one or more image files 452 of promotional products associated with product information block 400. The format of the image files included in image file portion 450 is not limited to any particular format, or to a same format among any plurality of images files included in image file portion 450. Image file formats can include any format useful for generating composite images to be displayed as part of a customized virtual catalog.

In various embodiments, at least one of the images included in the image files 452 is used as the basis for an image of a promotional product that is decorated with a decorative logo and is displayed in one or more views when the customized virtual catalog is being accessed. In various embodiments, the images included in image files 452 can be displayed as one or more thumbnail images in the customized virtual catalog, wherein the user accessing the customized virtual catalog can select the thumbnail image in order to see an enlarged version of the selected composite image.

In some embodiments, the thumbnail images are selectable, and the selected thumbnail images are presented along with other selectable options that allow a user accessing the customized virtual catalog to edit the generated composite image, as further described herein. Editing can include editing parameters, such as but not limited to positional information, the parameters related to the client's preferences for how to display the composite image having the edited parameter when re-generating the composite images including the promotional product associated with product information block 400. In various embodiments, the edited information related to a given client's preferences are stored in the given client's information block or blocks, rather than in product information block 400, so that when the product information is used by other clients, they will not have images of the promotional product associated with product information block 400 appear as edited by the given client's preferences.

In various embodiments, one or more of the blocks included in product information block 400 is editable by a person who has authority to edit this information, such as a system administrator. By way of illustration, a system administrator can have access and authority to edit pricing information stored in pricing block 418 in order to update the information related to pricing as a reflection of price increases or price sales. By way of illustration, a system administrator can have access and authority to add, to amend, and to delete image files to reflect changes to the product associated with product information block 400.

Figure 5:
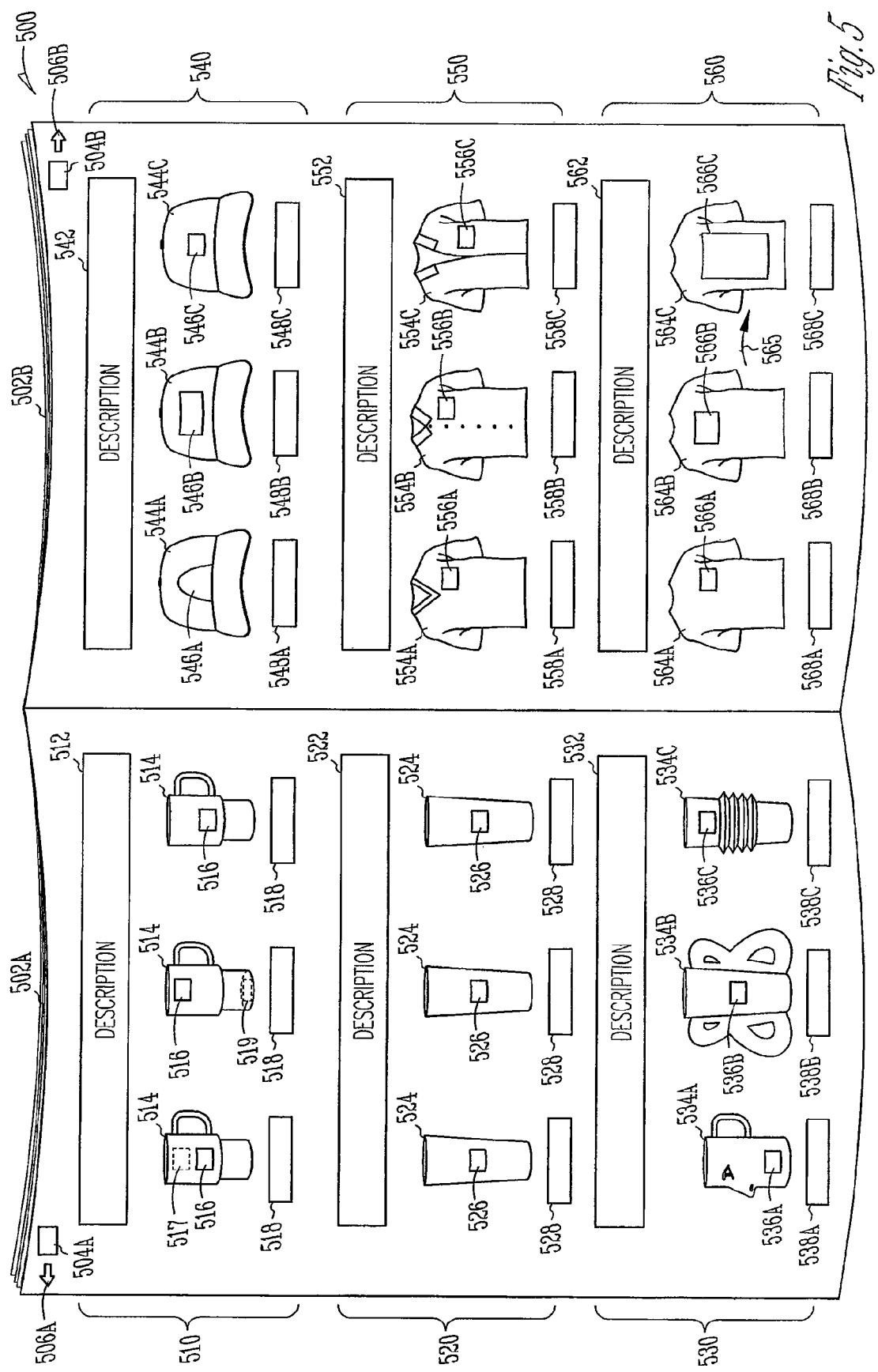
FIG. 5 is an illustration of a portion of a customized virtual catalog generated according to various embodiments.

FIG. 5 is an illustration of a portion of a customized virtual catalog 500 as generated according to various embodiments. Customized virtual catalog 500 includes one or more displayable pages 502A and 502B. Pages 502A and 502B include an illustrative display of one or more generated composite images of promotional products. Based on the settings as described herein with respect to the client information, the product information, and the relationships, one or more of the generated composite images in customized virtual catalog 500 includes images of promotional products decorated with a decorative logo designated for the client accessing the customized virtual catalog 500.

In various embodiments, pages 502A and 502B included a page indicator 504A and 504B respectively, the page indicators 504A and 504B including some indication of which page is being displayed, such as but not limited to a page number. In various embodiments, one or both of pages 502A and 502B include a page scrolling feature 506A and 506B. Page scrolling features 506A and 506B, when present, are used in various embodiments to indicate to the client that additional display pages are available for viewing that are not currently shown on the display. In various embodiments, page scrolling features 506A and 506B provide a selectable portion of the display that can be selected, for example using a screen cursor or in conjunction with a touch screen, to indicate that a user viewing the display wishes to scroll to another page of the customized virtual catalog.

In various embodiments, pages 502A and 502B include one or more categories of displayed promotional products, such as any combination of promotional products 510, 520, 530, 540, 550, and 560. It would be understood that for any given display of pages 502A and 502B, more or less promotional products could be displayed, depending on factors such as the size of the display device used to view the customized virtual catalog, the size of the images being displayed. and the number of promotional products included in any given category being displayed.

In various embodiments, any one or more of promotional products 510, 520, 530, 540, 550, and 560 includes a description 512, 522, 532, 542, 552, and 562 respectively. Descriptions 512, 522, 532, 542, 552, and 562 are not limited to any particular type of description or types of information, and includes any types of information, symbols, graphics, or other means of conveying information related to the promotional products 510, 520, 530, 540, 550, and 560 respectively. In various embodiments, the descriptions include a product name, such as "drinking mug" or "Tee-shirt" that is descriptive of the associated promotional products. In various embodiments, the descriptions include the product description, such as size information, available colors, materials, washing instructions, pricing information, and promotional indications such as "NEW ITEM" or any other relevant information to be conveyed regarding the promotional products. In various embodiments, information included in the description is information included in the product information block associated with the product being displayed, such as but not limited to the product description stored in product information block 400 as shown in FIG. 4.

Returning to FIG. 5, one or more of the promotional products includes at least one generated composite image 514, 524, 534A-C, 544A-C, 554A-C, and 564A-C of the promotional products 510, 520, 530, 540, 550, and 560 respectively. By way of illustration, for promotional products 510 associated with drinking mugs, page 502A includes an illustration of three images of a drinking mug 514. In various embodiments, the three images of drinking mug 514 represent variations of a same type drinking mug, wherein the variations represent but are not limited to variations in the color for the drinking mug of promotional product 510. In various embodiments, each image of the drinking mug 514 includes an additional description 518 of the product being displayed. For example, additional description 518 could include a name of the color associated with the drinking mug directly above the particular additional description 518.

In various embodiments, the promotional products displayed include a decoration area. By way of illustration, drinking mugs 514 each have a decoration area 516. Decoration area 516 is an area designated as the default position where the decorative image of the decorative logo is applied to the image of the promotional product. The combination of the image of the decorative logo and the image of the promotional product is generated using positioning, sizing, warping, and manufacturing process information provided with either the promotional product's information or with the client information. Once generated, the composite image including the decorative logo applied to the promotional product is displayed when the customized virtual catalog is accessed. In various embodiments, the displayed images include the decorative logo or logos designated as the client's decorative logos or logos, and these images as displayed are customized to the particular client access and viewing the customized virtual catalog.

The promotional products are not limited to having a single designated decoration area per promotional product. Promotional products can include a plurality of designated decoration areas. By way of illustration, the drinking mugs 514 can have a first designated decoration area 516 on one side of the drinking mug, and a second designated area 517 on a second side, for example a second side of the outside of the drinking mug, or on the inside of the drinking mug 514. The location of the designated area is not limited to any particular location on the promotional product. By way of further illustration, a designated area 519 can be located on an inside and bottom surface of a drinking mug 514.

As shown in FIG. 5, in various embodiments, a plurality of promotional products are displayed on a single page of the customized virtual catalog. Promotional products 520 include a description 522 and a plurality of drinking cups 524 having additional descriptions 528 and designated decoration areas 526. Promotional products 530 include a description 532 and a plurality of novelty drinking cups 534A, 534B, and 535C having additional descriptions 538A, 538B, and 538C respectively, and designated decoration areas 536A, 536B, and 536C respectively. As illustrated by promotional products 534A, 534B, and 534C, promotional products within a given category of promotional products, such as "novelty drinking cups" can include differences between the products other than just a color or a size selection, and can include completely different styles, brands, types of materials used, or other distinguishing features.

Promotional products 540 include a description 542 and images of a plurality of baseball hats 544A, 544B, and 544C having additional descriptions 548A, 548B, and 548C respectively, and designated decoration areas 546A, 546B, and 546C respectively. As illustrated by promotional products 544A, 544B, and 544C, promotional products within a given category can include designated decoration areas that have different shapes. Designated decoration area 546A is an approximately semi-circular area, wherein designated decorative area 546B is an approximately rectangular area. Depending on the default and the customer settings any of the images of the plurality of baseball hats can include a decorative logo as part of a composite image.

Promotional products 550 include a description 552 and images of a plurality of shirts 554A, 554B, and 554C having additional descriptions 558A, 558B, and 558C respectively, and designated decoration areas 556A, 556B, and 556C respectively. As illustrated by promotional products 554A, 554B, and 554C, promotional products within a given category can include designated decoration areas that have different locations. Designated decoration area 556B is higher in relationship to shirt 554B than designated decorative area 556A is in relationship to shirt 554A, and decorative area 556C is lower with respect to shirt 554C than both the designated decorative areas for shirts 554A and 554B. Promotional products 560 include a description 562 and a plurality of images of Tee-shirts 564A, 564B, and 564C having additional descriptions 568A, 568B, and 568C respectively, and designated decoration areas 566A, 566B, and 566C respectively.

As illustrated by promotional products 564A, 564B, and 564C, promotional products within a given category can include the capability to choose between a plurality of predetermined sizes for the designated decoration areas 566A, 566B, and 566C. As illustrated by arrow 565, designated decoration area 566B represents a first size designated decoration area, and designated decoration area 566C represents a second and larger size designated decoration area. In various embodiments, a client is allowed to select among two or more pre-determined sizes for a designated decoration area, and can view how a given decorative logo would appear when rendered in a composite image onto the given promotional product in each of the pre-determined sizes. The number of pre-determined designated sizes is not limited to any particular number of pre-determined sizes. In various embodiments, a user is allowed to zoom to a larger or smaller decorative logo by enlarging or shrinking the size of the designated logo to any size between a first pre-determined decorative area and a second and different sized pre-determined decorative area.

In various embodiments, the customized virtual catalog is operable to allow a client accessing the customized virtual catalog to manipulate the images of one or more of the decorated promotional products. In various embodiments, the customized virtual catalog is operable to allow the client accessing the customized virtual catalog to select a different manufacturing processes for applying a decorative logo to a promotional product, and to have the image of the promotional product re-generated and displayed using the newly selected manufacturing process. In various embodiments, the customized virtual catalog is operable to allow the client accessing the customized virtual catalog to manipulate any combination of the logos, the positioning of the logo, a color of the promotional product, the color of the logo, the size of the logo, or some other editable parameter, and to have a new composite image including the promotional product decorated with the logo generated and displayed. In various embodiments, the customized virtual catalog is operable to allow a client accessing the customized virtual catalog to store any edited parameters so that these edited images will be generated and displayed to the client on future accesses to the customized virtual catalog.

As illustrated in FIG. 5, each of the promotional products illustrated is decorated. However, it would be understood that it is not necessary that each and every promotional product illustrated include a decoration. In various embodiments, one or more of the promotional products are illustrated as being blank, that is, without the additional of a decorative image. By way of illustration, if a particular client for which the customized virtual catalog is being generated has only one, or only a few, decorative images associated with the client, and none of these images are appropriate for some reason to decorate a particular promotional product being illustrated, that particular promotional product can still be illustrated without the image of the promotional product including any decoration.

An illustration of a promotional product that would not necessarily be shown with a decoration is a instance where the designated imprint area for decorating the particular promotional product is not appropriate, for example by being too small, for any of the decorative images available to the client accessing the customized virtual catalog. In another illustration, a given decorative image can have a defined minimum diameter that is necessary for any curved surface contemplated for application of the decorative image. A particular promotional product, for example an ink pen used for writing, can have a diameter associated with the body of the ink pen that is less than the minimum diameter required for the decorative image. In such instances, the decorative image having the minimum diameter requirement would not be available for application to the ink pen in a generated composite image.

It would be understood that the plurality of promotional products illustrated in any given page or pages of a customized virtual catalog, or throughout the entire customized virtual catalog, can be decorated with various versions of a single decorative image if a decorative image is applied to the any particular image of a promotional product. However, any given one, or combination of promotional products included in a given page or pages of a customized virtual catalog are not restricted to being shown as decorated with a same decorative image. In various embodiments, different images of promotional products, whether the same type of promotional product or different types of promotional products, can be decorated with any number of different decorative images in any combination.

As illustrated in FIG. 5, any given decorative image can be illustrated on a composite image of a promotional product in variations including showing the decorative image using different sizes for the decorative image, different positions for the decorative image, or variations such as different colors or different combinations of colors used for the decorative image on a same type of promotional product.

In various embodiments, the composite images illustrated in the customized virtual catalog can provide "suggestions" to a user accessing the customized virtual catalog. Suggestions can include composite images generated as one or more suggested variations for decorating a promotional product, including variations on the decorative image used to decorate the promotional product, variations in the positioning of the decorative image on the promotional product, sizing variations of the decorative image used to decorate the promotional product, or any other variations of the characteristics of the decorative image as applied to the image of the promotional product.

In various embodiments, some form of built-in intelligence, such as artificial intelligence, is incorporated into the system used to generate the composite images and that is operable to generate and to provide to the user one or more of these suggestions. In various embodiments, information provided to a user accessing the customized virtual catalog can include pricing information indicative of the prices for providing one or more of the "suggestions" illustrated as part of the customized virtual catalog.

Figure 6:
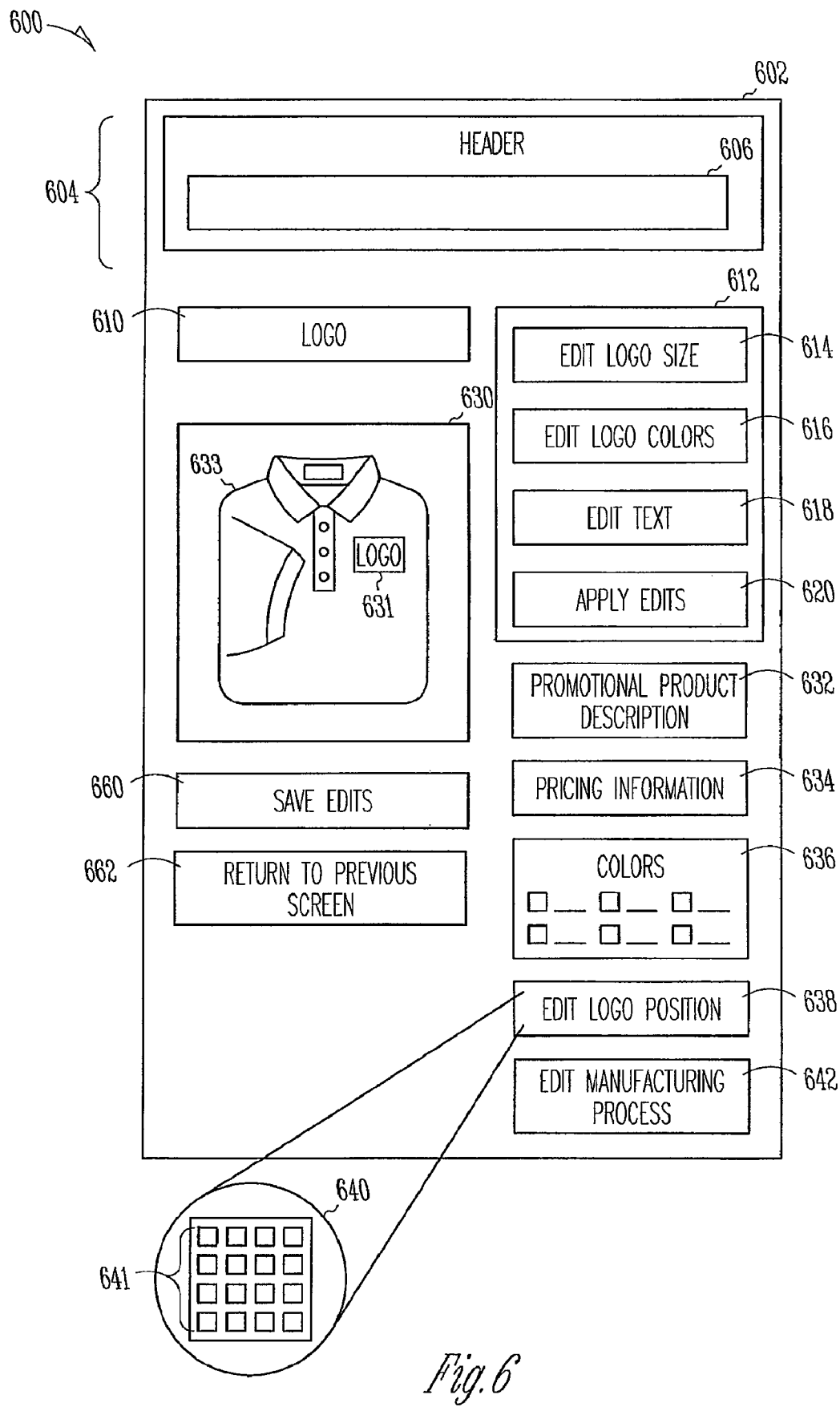
FIG. 6 is an illustration of a screen generated as part of a customized virtual catalog according to various embodiments.

FIG. 6 is an illustration 600 of a screen 602 generated as part of a customized virtual catalog according to various embodiments. In various embodiments, screen 602 includes a header 604. Header 604 is not limited to any particular type of header, and in various embodiments, includes any combination of a title identifying the screen, and an address block including the address, such as a web page address, of screen 602. In various embodiments, header 604 includes on or more icons 606 associated with pull-down menus or toolbars, including icons for requesting and initiating such actions a "BACK", "FORWARD", "REFRESH", HOME," and "PRINT," as would be understood by users and designers of web pages and computer screens.

In various embodiments, screen 602 includes a logo block 610 and a composite image block 630. In various embodiments, the composite image block 630 includes an image of a selected promotional product 633 decorated with a decorative image 631. The promotional product selected for display in composite image block 630 can be a promotional product selected from a customized virtual catalog, such as the customized virtual catalog as shown in FIG. 5. Referring again to FIG. 6, the decorative image 631 shown in composite image block 630 in various embodiments is the default decorative image for this promotional product and associated with the particular client accessing screen 602 through the accessing of the customized virtual catalog.

In various embodiments, the decorative image 631 is also displayed as a logo in the logo block 610. In various embodiments, one or more edit buttons are included in a logo edit box 612 that allow a user to actuate a given one of the one or more edit buttons and to edit a particular aspect of the logo displayed in logo block 610. By way of illustration, an edit logo size button 614 allows a user to actuate button 614 and be provided with options to edit the size of the logo displayed in logo block 610. In various embodiments, editing the size of the logo includes choosing from a plurality of pre-determined sizes, such as small, medium, and large.

In various embodiments, an edit logo colors button 616 is provided as part of screen 602, wherein actuation of button 616 provides a user with options for editing the colors of the logos displayed in logo block 610. In various embodiments, actuation of button 616 provides a user with options for editing the transparency of different portions of the logo relative to each other and relative to the background behind the logo displayed in logo block 610. In various embodiments, and edit text button 618 is provided as part of screen 602, wherein actuation of button 618 provides a user with options for editing any text included as part of the logo displayed in logo block 610.

In various embodiments, as edits are being made to the logo, the changes to the logo automatically appear as the logo displayed in logo block 610. In various embodiments, the edits made to the logo automatically appear as the decorative image 631 in the composite image block 630. In various embodiments, any edit made to the logos in logo block 610 are not applied to the composite image block 630 until actuation of the apply edits button 620 has occurred.

The methods of editing the decorative logo or logos displayed in logo block 610 are not limited to any particular methods, and include any software program or other means for editing an image.

In various embodiments, screen 602 includes a promotional product description block 632. In various embodiments, block 632 includes any combination of information related to the promotional product included in composite image block 630, including but not limited to information describing the promotional product, delivery information related to the decorated promotional product including expected time from order to delivery, minimum order quantity information, available size information if applicable, and available material information if applicable.

In various embodiments, screen 602 includes pricing information block 634. In various embodiments, pricing information block 634 includes any combination of unit pricing information, sale pricing information, quantity discount pricing information, pricing information based on materials selected for the promotional product, and pricing information based on the manufacturing process chosen for decorating the promotional product. By way of illustration, pricing for a shirt decorated using screen printing can have a different price than the same shirt decorated using embroidery.

In various embodiments, screen 602 includes color block 636. In various embodiments, block 636 indicates the available colors for the promotional product 633 shown in composite image block 630. In various embodiments, block 636 is operable to allow a selection of a different color than the one currently displayed in composite image block 630, and when a different color is selected, the composite image block 630 is updated to show the promotional product 633 using the newly selected color.

In various embodiments, screen 602 includes an edit logo position block 638. In various embodiments, the decorative image 631 is located on the promotional product 633 based on a default location. In various embodiments, actuation of block 638 allows selection of a new position for the decorative image 631 on promotional product 633. In various embodiments actuation of block 638 causes a positioning grid 640 to be displayed, wherein the positioning grid 640 allows selection of a grid point 641 that is indicative of a present or a new location for the decorative image on the promotional product. In various embodiments, a selection on the positioning grid 640 indicates a relative move of the logo in the direction indicated by the selection on the positioning grid relative to the current position of the logo on the promotional product. In various embodiments, a selection on the positioning grid 640 is indicative of an absolute position selection for the logo relative to the promotional product.

In various embodiments, screen 602 include an edit manufacturing process block 642. In various embodiments, block 642 includes a listing of any of the different manufacturing processes that are available for applying the decorative image 631 to the promotional product 633. In various embodiments, the composite image block 630 shows the promotional product decorated using a default manufacturing process. In various embodiments, actuation of block 642 is operable to allow a selection of a different manufacturing process than the default manufacturing process, and to have the composite image block 630 updated to show the promotional product displayed having decorative image 631 applied using the newly selected manufacturing process.

In various embodiments, screen 602 includes a save edits button 660. In various embodiments, actuation of button 660 is operable to have any edits, including any edits to the logo, any edits to the positioning, any edits to the size of the logo, and edits to the manufacturing processes displayed for the particular promotional product, or in some embodiments, for the entire category of promotional products included in the same category as the edited promotional product, when the users leaves screen 602 and returns to the pages of the customized virtual catalog that includes these edited promotional products. In some embodiments, actuation of the save edits button 660 cause the edits performed while in the most recent display of screen 602 to be saved as part of the client information associated with the client accessing the customized virtual virus catalog and performing the edits.

In various embodiments, screen 602 includes a return to previous screen button 662. In various embodiments, actuation of button 662 cause the display of screen 602 to be exited, and to return a user to a previously displayed screen in the customized virtual catalog. In various embodiments, actuation of button 662 will not result in any of the edits performed while screen 602 was being displayed in the most recent session to be saved, or will not cause any edits to be saved that were made since the last actuation of the save edits button 660.

Figure 7:
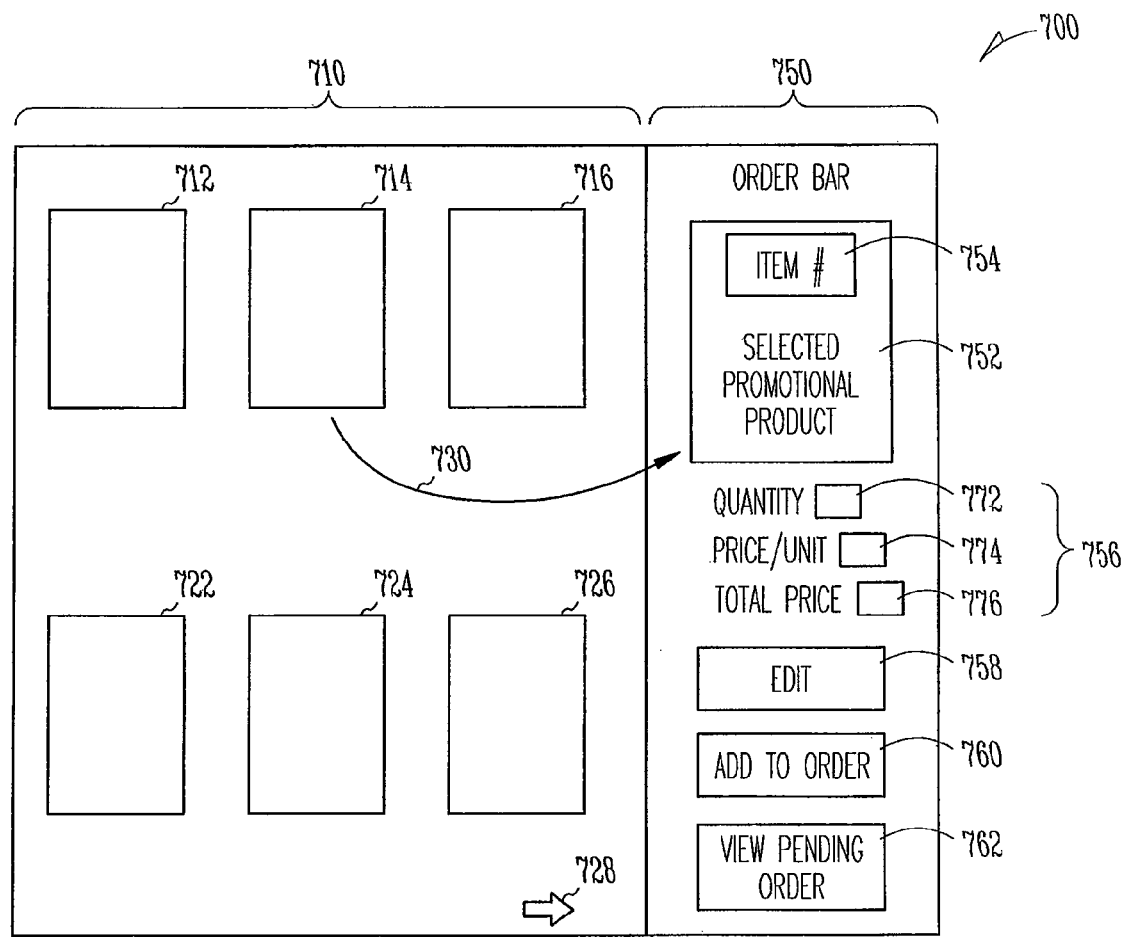
FIG. 7 is an illustration of a diagram of a portion of a customized virtual catalog having an order bar as included in various embodiments.

FIG. 7 is an illustration of a diagram 700 of a portion of customized virtual catalog having an order bar as included in various embodiments. Diagram 700 includes a promotional products portion 710 and an order bar portion 750. Promotional products portion 710 includes any views of generated composite images included a part of a customized virtual catalog, including but not limited to the customized virtual catalog as shown in FIG. 5.

Referring again to FIG. 7, the promotional products portion 710 includes a number of images of promotional products 712, 714, 716, 722, 724, 726. The images of the promotional products are not limited to any particular promotional products, or any particular combination of images of promotional products, and can include any number and any combination of images of promotional products.

In various embodiments, order bar portion 750 is displayed to a client accessing the customized virtual catalog alongside the promotional products portion 710. It would be understood that the order bar is not limited to being along a side of the promotional products portion 710, and in various embodiments, is displayed in another position relative to the promotional product images, including above or below the promotional product images. In various embodiments, the order bar is a separate screen the user changes the display to, for example, by selecting a graphic symbol such as arrow 728.

In various embodiments, order bar portion 750 includes any combination of the following: a selected promotional product box 752, item number box 754, order parameters 756, edit button 758, add-to-order button 760, and view pending order button 762. In various embodiments, a client device used to display diagram 700 while the client is accessing a customized virtual catalog is operable to allow selection of any one of promotional products 712, 714, 716, 722, 724, 726, and to place the selected promotional product into the selected promotional product box 752. Selection of and movement of the selected item to the selected promotional product box 752 is not limited to any particular means, and in various embodiments is performed using a "drag-and-drop" operation wherein the item is selected using a cursor on the client device and having the selected item drug over to the selected promotional product box 752 using a movement of the cursor.

In various embodiments, an item can be selected and moved to the selected promotional product box 752 by entering an item number of a promotional product into item number box 754 By way of illustration, the selection of promotional product 714 and the movement of the promotional product 714 into selected promotional product box 752 is illustrated by arrow 730.

In various embodiments, order parameters 756 include any combination of the following: quantity, price per unit, and total price. In various embodiments, when a promotional product is selected and moved to the selected promotional product box 752, a price per unit will automatically be calculated and displayed in price/unit box 774. The generated price includes a price based on a combination of any of the features of the selected promotional product, including the item itself, the material used to form the item, and the manufacturing process used to decorate the item with a decorative logo. By way of illustration, the cost of embroidery used to decorate a promotional product is a function of both the number of different colors of thread required, and the total number of stitches required. The automatically calculated price in price/unit box 774 already takes these costs into consideration in generating the displayed price because the information associated with the composite image is known as part of generating the composite image.

In various embodiments, when a promotional product is selected and placed into the selected promotional product box 752, a default quantity, such as but not limited to a default quantity of "1" appears in the quantity box 772. In various embodiments, based on the quantity and the price/unit, a total price is generated and displayed in the total price box 776. In various embodiments, the quantity appearing in the quantity box 772 is editable, and if changed a resultant new total price will be automatically generated and displayed in the total price box 776. In various embodiments, the generated and displayed total price automatically takes into account any discounts per unit price that are applicable based on the quantity in quantity box 772. In various embodiments, if the quantity in quantity box 772 is changed, and the change results in a different price/unit, the new price per unit will be automatically displayed in the price/unit box 774.

Edit button 758 is a selectable portion of the display that when selected, provides a display operable to allow editing of one or more features of the promotional product currently present in the selected promotional product box 752. In various embodiments, actuation of the edit button 758 provides the promotional product presented in the selected promotional product box 752 in a screen such as the edit screen of FIG. 6. When in the edit screen, the features associated with the selected promotional product, such as color, size, manufacturing process used to decorate the promotional product, selection of a different logo, re-designing of the logo, changing the position of the logo, changing the size of the logo, and any other editable features of the promotional product are available for editing. Once the changes are finalized, an option to return to the order bar portion 750 is presented, and when actuated returns the composite image of the decorated promotional product, as now edited, as the image in the selected promotional product box 752. In various embodiments, any changes to the order parameters 756 affected by the editing are automatically reflected in order parameters 756 upon returning to the screen displaying the order bar.

The add-to-order button 760 is a selectable portion of the display in order bar portion 750. In various embodiments, when the add-to-order button 760 is actuated, the promotional product as present in the selected promotional product box 752, along with the order parameters 756 present at the time the add-to-order button 760 is actuated, are saved and added to a pending order for the client. In various embodiments, the pending order is saved to an order database, such as order database 196 as shown in FIG. 1A.

Referring again to FIG. 7, the view pending order button 762 is a selectable portion of the order bar. When actuated, the view pending order button 762 allows the display of a pending order for the client. In various embodiments, the pending order can include includes any number of previously selected and added promotional products. In various embodiments, any of the pending orders, including the price information associated with any of the decorated promotional products included in the pending order, can be formed into an email that can be provided to one or more parties, including parties receiving the email over network 110 from server 120, for the one or more parties to review.

In various embodiments, when a client accessing the customized virtual catalog wishes to place an actual order for a pending order, the client can select a "place order" selection, such as button 872 in FIG. 8 as further described below, wherein when selected an order will be placed for all of the promotional products included in the pending order. In various embodiments, the placed order, including ordering information such as billing information, and shipping address information, can be obtained from the customer database 194 as shown in FIG. 1A.

Figure 8:
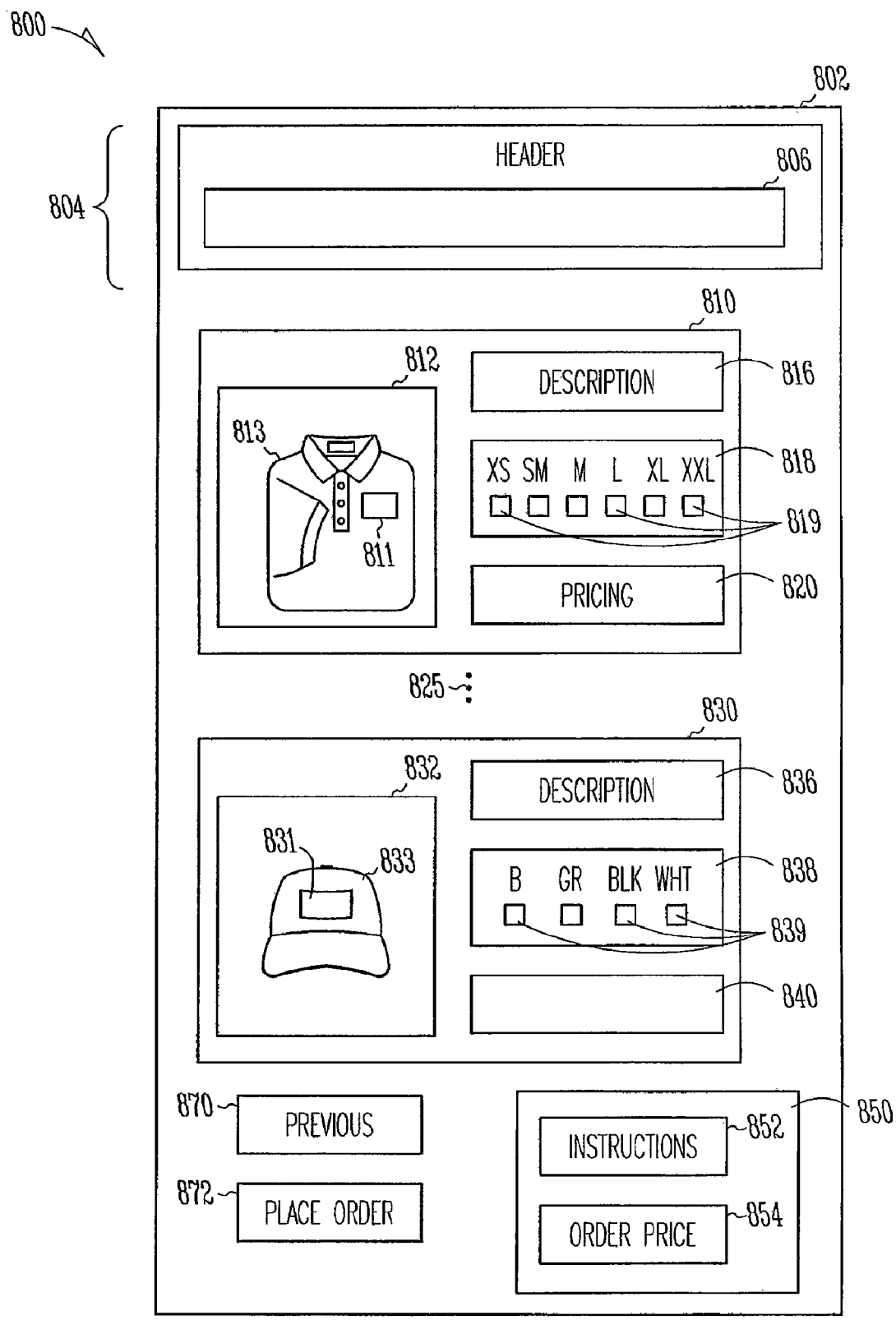
FIG. 8 is an illustration of a screen included in a customized virtual catalog for a pending order according to various embodiments.

FIG. 8 is an illustration 800 of a screen 802 included in a customized virtual catalog for a pending order according to various embodiments. In various embodiments, screen 802 includes a header 804, which may include one or more icons 806 similar to icons 606 discussed regarding FIG. 6. Screen 802 includes at least one item 810 included in a pending order for a decorated promotional product. In various embodiments, screen 802 includes a plurality of items 810 through 830, as represented by items 810 and 830 and dotted line 825. The number of items included in a pending order is not limited to any particular number of items, and can include any number of items placed into the pending order by a client accessing the customized virtual catalog.

It would be understood that screen 802 could in various embodiments include a plurality of screens that are not all provided as part of illustration 800, wherein different ones of the screens are displayed as screen 802 is paged or scrolled.

In various embodiments, item 810 includes a composite image 812 of the promotional product 813 decorated using the decorative image 811, as pending in the pending order. In various embodiments, item 810 includes a description box 816. Description box 816 is not limited to any particular type of description or information, and can include any type of information, including a description of the promotional product 813, a description of the manufacturing process chosen to decorate the promotional product 813, and any other information, including but not limited to, delivery time. In various embodiments, item 810 includes an order box 818. In various embodiments, order box 818 includes boxes including a numeral indication 819 indicative of the particular number of the items included in the pending order related to item 810 that fall into one or more different categories.

By way of illustration, order box 818 can include a series of sizes available for promotional product 813, and can include a number for each of the sizes indicative of the number of promotional products 813 that are included in the pending order for each of the sizes. Order box 818 is not limited to any particular type of information or types of categories, and can include any categories appropriate for the decorated items included in composite image 812, including categories of manufacturing processes, sizes, and colors.

In various embodiments, pricing box 820 includes pricing information related to the pending order for the decorated images included in item 810. In various embodiments, pricing information includes the actual price per individual one of the decorated promotional products based on the total quantity of the items illustrating in the composite image 812 that are being ordered.

As shown in FIG. 8, additional items, such as item 830, can include any one or any combination of the features described for item 810. Item 830 includes a composite image 832 including promotional product 833, a baseball hat, decorated with decorative image 831. In various embodiments, item 830 includes description 836, order box 838, and pricing 840. As shown in order box 838, in various embodiments, an order box can include categories indicative of colors available for promotional product 833, and a numerical indication 839 of the quantity by color that are included in a pending order for decorated promotional products included in composite image 832.

In various embodiments, screen 802 includes a pending order box 850. In various embodiments, pending order box 850 includes instructions 852, including but not limited to instructions such as billing and shipping instructions related to the pending order of screen 802. In various embodiments, pending order box 850 includes an order price box 854 including but not limited to information indicating a total price for the pending order, including information such as sales tax, and shipping and handling costs of the order as pending.

In various embodiments, screen 802 is operable to allow a user to edit the pending order. Editing can include editing a quantity of a particular item in the pending order by selection, for example by actuating a cursor moved onto the portion of screen 802 to be edited. In various embodiments, pricing information for example in boxes 820, 840, and 854 are automatically updated to reflect any changes made in screen 802 that affect price. In various embodiments, a selection made in screen 802 on any one of a composite image, such as composite image 812 or 832, takes a user to an edit screen, such as the screen described with respect to FIG. 6, and allows a user to further edit the composite image that eventually will be included in the pending order provided in screen 802. Once competed, the editing will be reflected in the composite images and in the other information included in an item of the pending order, as shown in screen 802.

In various embodiments, screen 802 includes a previous button 870 operable to, when actuated, return the client accessing the virtual catalog to a previous display that was being provided before the client requested to view display screen 802. In various embodiments, when a client is ready to place an actual order for the pending order included in screen 802, the place order button 872 is operable to be actuated to generate an actual order for the decorated promotional products included in the pending order of screen 802.

Figure 9:
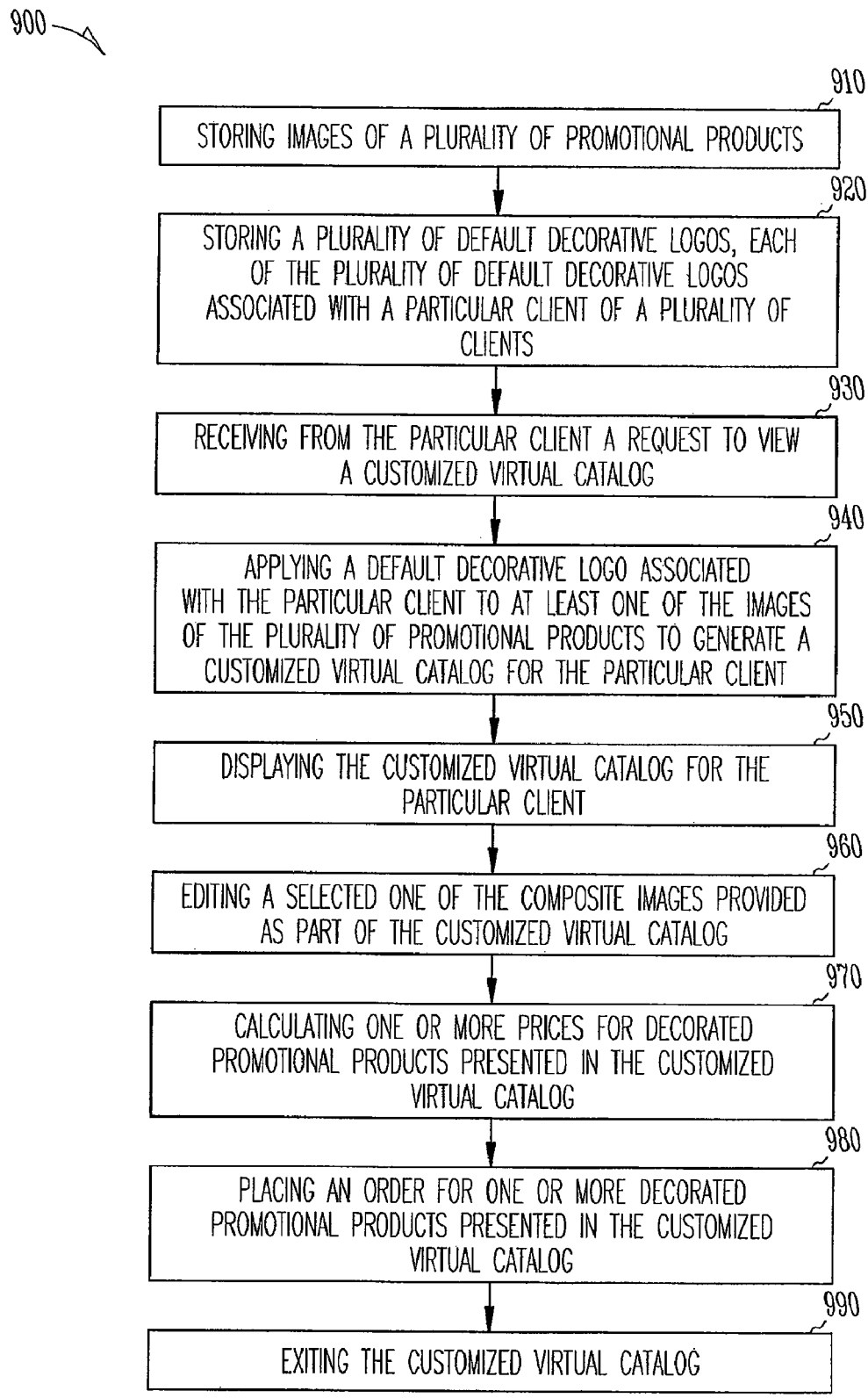
FIG. 9 is a flowchart of various methods according to various embodiments.

FIG. 9 is a flowchart of various methods 900 according to various embodiments.

At block 910, various methods 900 include storing images of a plurality of promotional products. In various embodiments, storing images of a plurality of promotional products includes receiving product information, including but not limited to, the product information described with respect to product information block 400 as shown in FIG. 4. In various embodiments, storing images of a plurality of promotional products includes any of the methods of receiving and storing information related to products as included in chart 101 shown in FIG. 1B.

At block 920, various methods 900 include storing a plurality of default decorative logos, each of the plurality of default decorative logos associated with a particular client of a plurality of clients. In various embodiments, storing default decorative logos associated with a particular client includes generating the client information included in client information block 300 as shown in FIG. 3.

In various embodiments, storing a plurality of default decorative logos includes setting up a first time user as a client. In various embodiments, first time users are prompted to enter customer information, e.g. name, address, phone number, billing address, payment information, and are assigned a user identification and password that are user-modifiable. Upon entering a user id and a password, the information is sent to the server 120, where validation of the entered information is done against a customer database, such as customer database 194, that contains all the relevant customer information.

In various embodiments, upon successful validation, a first time user is prompted to enter one or more default logos that will be associated with the first time user's client information on any further requests for access to the customized virtual catalog. In various embodiments, the first time user is prompted to upload one or more images to be used as default logos. In various embodiments, the first time user will be offered a catalog of available logos that can be selected by the first time user as one or more default logos for the first time user on future accesses to the customized virtual catalog. In various embodiments, a first time user will be prompted to establish relationships between default logos and the available promotional products by indicating which default logos are to be applied to which, or to all of, the promotional products available for display in the customized virtual catalog.

It would be understood that for any client accessing the customized virtual catalog, some logos can be commonly used by one or more clients as default logos or additional logos. For example, an image that is in the public domain, for example an image of a flower, can be provided to and used by a plurality of customers as a decorative image in the composite images of each of a plurality of customized virtual catalogs. In addition, certain logo, for example a logo including a trademark, are reserved and are unique to a particular client or group of clients for use in generating composite images using the unique logo for only the particular client or group of clients.

At block 930, various methods 900 include receiving from the particular client a request to view a customized virtual catalog. In various embodiments, receiving from a particular client a request to view a customized virtual catalog includes identifying the particular client through a login used to access the customized virtual catalog. In various embodiments, receiving from a particular client a request to view a customized virtual catalog includes identifying a particular client device, such as but not limited to, a particular one of the client devices 102A-N as shown in FIG. 1A, in order to determine which particular client is requesting the access to the customized virtual catalog.

At block 940, various methods 900 include applying a default decorative logo associated with the particular client to at least one of the images of the plurality of promotional products to generate a customized virtual catalog for the particular client. In various embodiments, generating the customized virtual catalog for the particular client includes applying at least one decorative logo associated with the particular client to every one of the plurality of promotional products available in the customized virtual catalog for the particular client. In various embodiments, generating the customized virtual catalog includes generating the customized virtual catalog using a set of relationships linking a client information for the particular client requesting the access to a set of product information blocks including images of the promotional products in order to determine which decorative images are to be applied to which of the images of the promotional products to be displayed as the composite images included in the customized virtual catalog for the particular client.

At block 950, various methods 900 include displaying the customized virtual catalog for the particular client. In various embodiments, displaying the customized virtual catalog includes generating the customized virtual catalog at an application server including a visualization server and a compositing engine, and using a web server to communicate the generated customized virtual catalog over the internet to a web browser. In various embodiments, displaying the customized virtual catalog for the particular client includes displaying decorative images using warping to apply the decorative images to the composite image of the promotional products being displayed. In various embodiments, displaying the customized virtual catalog for the particular client includes displaying the decorative image using a filter to make the decorative image appear on the image of the promotional product based on a manufacturing process selected for use in applying the decorative image to the actual promotional product.

In various embodiments, displaying the customized virtual catalog includes selections by the client on a thumbnail image, and presenting an enlarged image of the composite image including the selected decorated promotional product with detailed description of the decorated promotional product.

At block 960, various methods 900 include editing a selected one of the composite images provided as part of the customized virtual catalog. In various embodiments, editing a selected one of the composite images includes editing the logo used as the decorative image applied to the image of the promotional product, including editing a size, a color or colors, any transparency features, or any text included in the logo. In various embodiments, editing a selected one of the composite images includes substituting a different logo in place of the logo provided in the composite image.

In various embodiments, editing the composite image includes editing the position of the decorative image as the decorative image is applied to the image of the promotional product. In various embodiments, editing the composite image includes editing the appearance of the decorative image as applied to the promotional product by selecting a different manufacturing process to be used to apply the decorative image to the actual promotional product. In various embodiments, editing the composite image includes saving edits related to the composite image of a decorated promotional product as the default composite image to be generated on future accesses to the customized virtual catalog by the same particular client who performed and saved the edits.

At block 970, various methods 900 include calculating one or more prices for decorated promotional products presented in the customized virtual catalog. In various embodiments, calculating one or more prices includes calculating one or more prices based on a choice of the type of material used to make the promotional product. In various embodiments, calculating one or more prices includes calculating one or more prices based on the selection of the manufacturing process to be used to apply the decorative image to the actual promotional product.

In various embodiments, calculating one or more prices includes calculating a price for the decorated promotional product based on the number of different colors included in the decorative image used to decorate the promotional product. In various embodiments, calculating one or more prices includes calculating a price for the decorated promotional product based on the size of the decorative image used to decorate the promotional product.

In various embodiments, when embroidery is chosen as the manufacturing process to be used to apply the decorative image to the promotional product, a calculation is made as to the number of stitches required to make the decorative image based on a size of the decorative image by area, multiplied by the average number of stitches in a given area to determine a price per decorated promotional product using embroidery.

In various embodiments, calculating one more prices includes calculating prices based on a quantity of the decorated promotional products being ordered by the client.

At block 980, various methods 900 include placing an order for one or more decorated promotional products presented in the customized virtual catalog. In various embodiments, placing an order for one or more decorated promotional products includes selecting a particular promotional product that is displayed as decorated with a decorative image associated with the client placing the order, and dragging the composite image of the decorated promotional product to a portion of the display designated as an order bar.

At block 990, various methods 900 include exiting the customized virtual catalog. In various embodiments, exiting the customized virtual catalog includes saving to the client information associated with the particular client exiting the customized virtual catalog any information, including but not limited to history and default settings, relate to the activities performed on any of the screens, and to any orders by the particular client while accessing the customized virtual catalog.

Various embodiments of a customized virtual catalog have been described herein. Various embodiments include an apparatus comprising a server operable to generate a customized virtual catalog including a plurality of composite images, wherein at least one of the plurality of composite images includes an image of a promotional product decorated using a decorative image associated with a client requesting access to the customized virtual catalog.

Various embodiments include a network based transaction system comprising a server coupled to a network, at least one client device coupled to the server through the network, the server coupled to a product image database storing product information and a plurality of stored images of promotional products including a base product operable to be decorated using a decorative image, the server coupled to a logo database storing image files including image files having a default logo associated with each particular one of a plurality of clients, and the server coupled to a customer database storing customer information associated with each particular one of the plurality of clients, wherein the server is operable to determine which particular one of the plurality of clients is requesting access to the server, and to generate a customized virtual catalog for the particular one of the plurality of clients requesting access to the server, the customized vital catalog including at least one composite image having an image of one of the promotional products decorated with the default logo associated with the particular client requesting the access.

Various embodiments include a machine-readable medium comprising a computer memory storing instructions, which when implemented by one or more processors perform the following operations: storing images of a plurality of promotional products, wherein each of the plurality of promotional products is operable to be decorated by application of a decorative logo, storing a plurality of default decorative logos, each of the plurality of default decorative logos associated with a particular client of a plurality of clients, and each of the plurality of default decorative logos operable to be applied as a decoration to one or more of the plurality of promotional products, receiving from the particular client a request to view a customized virtual catalog including the plurality of promotional products, applying a default decorative logo associated with the particular client to at least one of the images of the plurality of promotional products to generate a customized virtual catalog for the particular client including a composite image of the default decorative logo applied to the at least one of the images of the plurality of promotional products.

Various embodiments include a method comprising storing images of a plurality of promotional products, wherein each of the plurality of promotional products is operable to be decorated by application of a decorative logo, storing a plurality of default decorative logos, each of the plurality of default decorative logos associated with a particular client of a plurality of clients, and each of the plurality of default decorative logos operable to be applied as a decoration to one or more of the plurality of promotional products, receiving from the particular client a request to view a customized virtual catalog including the plurality of promotional products, and applying a default decorative logo associated with the particular client to at least one of the images of the plurality of promotional products to generate a customized virtual catalog for the particular client including a composite image of the default decorative logo applied to the at least one of the images of the plurality of promotional products.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus comprising:
a server including a customer database operable to store information associated with one or more clients accessing the server to request generation of a customized virtual catalog;
wherein the server is operable to set up a user as a particular client, including the user's entering customer information for storing in the customer database;
wherein the customer information of the particular client includes one or more default decorative images selected by the particular client and to be associated with the particular client upon requests for access to the customized virtual catalog by the particular client;
wherein the server is operable to process the information associated with the particular client of the one or more clients, such information including relationships linking the one or more default decorative images associated with the particular client to one or more promotional products, the relationships including a mapping of which of the one or more default decorative images associated with the particular client is to be used to decorate which images of different promotional products included in a plurality of composite images in the virtual catalog generated for the particular client; and
wherein, when the particular client requests access to the server, the server is operable to generate the customized virtual catalog including the plurality of composite images, wherein each of the composite images includes a different promotional product image automatically decorated using the one or more default decorative images associated with the particular client.

2. The apparatus of claim 1, wherein the customer database information includes a plurality of different promotional product images, and wherein a first default decorative image of the one or more default decorative images associated with the particular client requesting access to the customized virtual catalog appears, without further action by the particular client, on each of the plurality of different promotional product images when the customized virtual catalog is generated.

3. The apparatus of claim 1, wherein a second default decorative image associated with the particular client requesting access to the customized virtual catalog is one of the default decorative images that appears on every one of a second plurality of composite images when the customized virtual catalog is generated.

4. The apparatus of claim 1, wherein the server includes a database server operable to couple the server to a customer database, the customer database storing an image file for at least one default decorative image associated with the particular client requesting access to the customized virtual catalog.

5. The apparatus of claim 1, wherein one of the default decorative images associated with the particular client requesting access to the customized virtual catalog appears, without further action by the particular client, on each of one or more images of promotional products that belong to a particular category of promotional products.

6. The apparatus of claim 1, wherein the server includes a compositing engine operable to generate the plurality of composite images, each of the composite images including an image of a different promotional product decorated using a default logo as one of the default decorative images associated with the particular client requesting access to the customized virtual catalog.

7. The apparatus of claim 1, wherein at least one of the relationships linking a given default decorative image to a given one of the promotional products includes instructions regarding a particular color to be used for the default decorative image in relation to a particular color for the given one of the promotional products.

8. The apparatus of claim 1, wherein the plurality of composite images are generated using warping information to warp the default decorative image onto the image of the promotional product.

9. The apparatus of claim 1, wherein the server includes a product database operable to store product information associated with at least one of the plurality of promotional product images, and including at least one product image file depicting an image of the at least one promotional product.

10. A network based transaction system comprising:
a server coupled to a network;
at least one client device coupled to the server through the network;
the server coupled to a product image database storing product information and a plurality of stored images of promotional products including a base product operable to be decorated using a decorative image;
the server coupled to a logo database storing image files including image files having a different default logo associated with each particular one of a plurality of clients; and
the server coupled to a customer database storing customer information associated with each particular one of the plurality of clients;
wherein the server is operable to determine which particular one of the plurality of clients is requesting access to the server, automatically to generate a first customized virtual catalog for a first particular one of the plurality of clients requesting access to the server, the first customized virtual catalog including a first plurality of composite images each including a different promotional product image automatically decorated using a first default logo associated with the first particular one of the plurality of clients, and automatically to generate a second customized virtual catalog for a second particular one of the plurality of clients requesting access to the server, the second customized virtual catalog including a second plurality of composite images each including a different promotional product image automatically decorated using a second default logo associated with the second particular one of the plurality of clients; and
wherein the server includes a compositing engine operable to render the composite images included in the customized virtual catalogs based on relationships linking client information, associated with the particular clients requesting access, to a plurality of sets of product information.

11. The network based transaction system of claim 10, wherein one or more portions of the generated customized virtual catalogs are communicated to the network using a web server included within the server and coupled to the network.

12. The network based transaction system of claim 10, wherein the at least one client device is operable to display one or more portions of the generated customized virtual catalogs on a display included in the at least one client device.

13. The network based transaction system of claim 10, wherein the client device is operable to receive inputs at the client device, and to transmit the inputs from the client device through the network to the server, the inputs operable to edit one or more of the composite images being displayed at the client device as part of the generated customized virtual catalogs.

14. The network based transaction system of claim 13, wherein the inputs include inputs for editing the manufacturing process used as a filter in the composite image for the application of at least one of the default logos to the image of one of the promotional products.

15. The network based transaction system of claim 13, wherein the inputs include using a positioning grid to receive inputs for editing the positioning of at least one of the default logos on the image of one of the promotional products in the composite images being displayed at the client device.

16. The network based transaction system of claim 13, wherein the inputs include a request to place an order for one or more promotional products decorated as depicted in a generated customized virtual catalog for a particular client.

17. A method performed by at least one processor comprising:
the processor storing a plurality of images in memory, each of the plurality of images including an image of a promotional product, wherein each of the promotional products included in the images is operable to be decorated by application of a decorative logo;
the processor storing an image of one or more default decorative logos in memory, each of the default decorative logos associated with a different particular client of a plurality of clients and being selected by the particular client during a default logo selection operation, and each of the default decorative logos operable to be applied as a decoration to at least one of the plurality of the promotional products;
the processor receiving from a first particular client a request to view a customized virtual catalog including the plurality of promotional products;
the processor applying automatically without further action by the first particular client an image of a first default decorative logo associated with the first particular client to a plurality of the images of the plurality of promotional products to generate, for display on a screen to the first particular client, a first customized virtual catalog for the first particular client including a composite image of the first default decorative logo applied to the plurality of the images of the plurality of promotional products;

the processor receiving from a second particular client a request to view a customized virtual catalog including the plurality of promotional products;

the processor applying automatically without further action by the second particular client an image of a second default decorative logo associated with the second particular client to a plurality of the images of the plurality of promotional products to generate, for display on a screen to the second particular client, a second customized virtual catalog for the second particular client including a composite image of the second default decorative logo applied to the plurality of the images of the plurality of promotional products; and the processor, when applying the default decorative logos associated with the particular clients to the plurality of the images of the plurality of promotional products, generating the customized virtual catalogs using a set of relationships linking client information, associated with each particular client, to a plurality of product information blocks.

18. The method of claim 17, including displaying the customized virtual catalogs to the particular clients, including using a web server to communicate one or more portions of the customized virtual catalogs over a network to at least one client device having a display.

19. The method of claim 17, wherein receiving from each particular client the request to view the customized virtual catalog includes identifying the particular client through a login used to access the customized virtual catalog.

20. The method of claim 17, wherein receiving from the each particular client the request to view the customized virtual catalog includes identifying a particular client device to determine which particular client is requesting the access to the customized virtual catalog.

21. The method of claim 17, further including editing a selected one of the composite images provided as part of one of the customized virtual catalog, including substituting a different logo in place of the default decorative logo provided in the composite image included in the selected one of the composite images.

22. The method of claim 21, further including saving the edited selected one of the composite images by saving a relationship that links the substituted and different logo with the promotional product included in the selected one of the composite images.

23. The method of claim 17, further including calculating one or more prices for decorated promotional products present in one of the customized virtual catalogs based on the selection of a manufacturing process used to apply the decorative image to an actual promotional product, the actual promotional product being depicted by the image of the decorated promotional product in the composite image.

24. The method of claim 17, further including exiting one of the customized virtual catalogs including saving to a client information block some type of client information associated with the particular client exiting the customized virtual catalog, the client information including a history of which of the composite images were viewed by the particular client during the most recent access to the customized virtual catalog by the particular client.

25. A machine-readable medium comprising a computer memory storing instructions, which when implemented by one or more processors perform the following operations:

storing one or more images in the memory, each of the one or more images including an image of a promotional product, wherein each of the promotional products included in the images is operable to be decorated by application of a decorative logo;

storing one or more default decorative logos in the memory, each of the default decorative logos associated with a different particular client of a plurality of clients and being selected by the particular client during a default logo selection operation, and each of the plurality of default decorative logos operable to be applied as a decoration to at least one of the one or more of the promotional products;

receiving from a first particular client a request to view a customized virtual catalog including the plurality of promotional products;

applying automatically without further action by the first particular client a first default decorative logo associated with the first particular client to a plurality of the images of the plurality of promotional products to generate, for display on a screen to the first particular client, a first customized virtual catalog for the first particular client including a composite image of the first default decorative logo applied to the plurality of the images of the plurality of promotional products;

receiving from a second particular client a request to view a customized virtual catalog including the plurality of promotional products; and applying automatically without further action by the second particular client a second default decorative logo associated with the second particular client to a plurality of the images of the plurality of promotional products to generate, for display on a screen to the second particular client, a second customized virtual catalog for the second particular client including a composite image of the second default decorative logo applied to the plurality of the images of the plurality of promotional products;

wherein applying the default decorative logos associated with the clients to the plurality of the images of the plurality of promotional products includes applying the default decorative logos to the plurality of images of the plurality of promotional products based on relationships linking client information, associated with each particular client, to the plurality of promotional products.

26. The machine-readable medium of claim 25, including:

communicating the generated customized virtual catalogs over a network to at least one client device coupled to the network; and displaying one or more portions of a generated customized virtual catalog on a display included in the at least one client device.

27. The apparatus of claim 1, wherein the client request comprises a request originating from a particular client device.

28. The method of claim 17, wherein a plurality of different first default decorative logos associated with the first particular client are applied to respective different images of the plurality of promotional products to generate the first customized virtual catalog for the first particular client including a plurality of composite images of the plurality of first default decorative logos applied to the respective plurality of images of the plurality of promotional products.

29. An apparatus comprising:

a server operable to generate a customized virtual catalog concurrently displaying a plurality of composite images, the server including a customer database operable to store information associated with one or more clients accessing the server to request generation of the customized virtual catalog, wherein the server is operable to allow a client to enter customer information into the customer database, wherein the customer information of the client includes a first default decorative image and a second default decorative image selected by the client and to be associated with the client upon requests for access to the customized virtual catalog by the client, wherein, when the client requests access to the server, the server is operable to generate the customized virtual catalog including a plurality of composite images, wherein a first one of the composite images includes an image of a first promotional product automatically decorated using the first default decorative image uniquely associated with the request by the client to access the customized virtual catalog, wherein a second one of the composite images includes an image of a second promotional product automatically decorated using the second default decorative image uniquely associated with the client request; and the server being operable to apply the default decorative images to the images of the promotional products based on relationships linking client information, associated with each particular client, to the promotional products.

30. The apparatus of claim 29, wherein the client request comprises a request to view the first and second promotional products.

31. The apparatus of claim 1, wherein a second default decorative image associated with a second client requesting access to the customized virtual catalog is one of the default decorative images that appears on every one of a second plurality of composite images when the customized virtual catalog is generated.

32. The apparatus of claim 29, wherein the customer database information includes the first and second promotional product images, wherein the first default decorative image appears, without further action by the particular client, on the first promotional product image, and wherein the second default decorative image appears, without further action by the particular client, on the second promotional product image, when the customized virtual catalog is generated.

33. The apparatus of claim 29, wherein the plurality of composite images are generated using warping information to warp one of the default decorative images onto the corresponding image of the promotional product.

34. The apparatus of claim 29, wherein the server includes a product database operable to store product information associated with at least one of the promotional product images, and including at least one product image file depicting an image of the at least one promotional product.

* * * * *

UNITED STATES PATENT AND TRADEMARK OFFICE
CERTIFICATE OF CORRECTION

PATENT NO. : 8,335,724 B2
APPLICATION NO. : 12/191235
DATED : December 18, 2012
INVENTOR(S) : Sipes et al.

It is certified that error appears in the above-identified patent and that said Letters Patent is hereby corrected as shown below:

On the Title page, in column 2, under "Other Publications", line 4, delete "May 7, 2011" and insert --Mar. 7, 2011--, therefor In the drawings, Sheet 5 of 10, Fig. 4, reference numeral 420, line 1, delete "APPLIABLE" and insert --APPLICABLE--, therefor In the Specifications In column 2, line 21, after "plurality", insert --of--, therefor In column 10, line 20, delete "decorateable" and insert --decoratable--, therefor In column 10, line 60, delete "promotions" and insert --promotional--, therefor In column 12, line 13, before "the", insert --with--, therefor In column 12, line 28, delete "offer" and insert --offered--, therefor In column 12, line 46, delete "for" and insert --of--, therefor In column 14, line 11, before "drinking", insert --, such as--, therefor In column 14, line 25, after "to", delete "other", therefor In column 15, line 55, after "see", insert --are--, therefor In column 16, line 39, delete "for" and insert --to--, therefor In column 16, line 55, delete "associate" and insert --associated--, therefor Signed and Sealed this
Twenty-third Day of April, 2013

Teresa Stanek Rea
*Acting Director of the United States Patent and Trademark Office*

In column 17, line 20, after "for", delete "a", therefor

In column 17, line 26, delete "includes" and insert --include--, therefor

In column 18, line 15, delete "images" and insert --image--, therefor

In column 18, line 54, delete "increases" and insert --increase--, therefor

In column 20, line 14, delete "logos" and insert --logo--, therefor

In column 20, line 55, after "settings", insert --,--, therefor

In column 21, line 53, delete "additional" and insert --addition--, therefor

In column 22, line 58, delete "on" and insert --one--, therefor

In column 22, line 60, delete "a" and insert --as--, therefor

In column 24, line 46, delete "users" and insert --user--, therefor

In column 24, line 52, after "virtual", delete "virus", therefor

In column 25, line 1, after "included", insert --as--, therefor

In column 25, line 41, after "754", insert --.--, therefor

In column 26, line 46, after "include", delete "includes", therefor

In column 28, line 14, delete "competed" and insert --completed--, therefor

In column 31, line 3, delete "relate" and insert --related--, therefor

In column 31, line 30, delete "vital" and insert --virtual--, therefor

In column 32, line 14, after "(b)", insert --,--, therefor

In the Claims

In column 36, line 40, in Claim 25, after "includes", delete "¶", therefor